United States Patent
Ghazvinian et al.

[11] Patent Number: 5,936,570
[45] Date of Patent: Aug. 10, 1999

[54] LOW-EARTH ORBIT SATELLITE ACQUISITION AND SYNCHRONIZATION SYSTEM USING A BEACON SIGNAL

[75] Inventors: Farzad Ghazvinian, Mercer Island, Wash.; Mark A. Sturza, Encino, Calif.; Sami M. Hinedi, Bellevue, Wash.; Shiva S. Sarrafan, Issaquah, Wash.; Biren N. Shah, Kirkland, Wash.

[73] Assignee: Teledesic LLC, Kirkland, Wash.

[21] Appl. No.: 09/035,692

[22] Filed: Mar. 5, 1998

[51] Int. Cl.⁶ .............................. H04B 7/185; H04B 7/19
[52] U.S. Cl. .......................... 342/354; 342/356; 342/359; 455/13.2
[58] Field of Search ..................................... 342/352, 354, 342/356, 359; 455/12.1, 13.2

[56] References Cited

U.S. PATENT DOCUMENTS

| | | |
|---|---|---|
| 4,144,496 | 3/1979 | Cunningham et al. . |
| 4,484,356 | 11/1984 | Geesen et al. . |
| 4,567,485 | 1/1986 | Oshima et al. . |
| 4,630,058 | 12/1986 | Brown . |
| 4,663,631 | 5/1987 | Brilman et al. . |
| 4,752,967 | 6/1988 | Bustamante et al. . |
| 4,763,129 | 8/1988 | Perrotta . |
| 5,095,538 | 3/1992 | Durboraw, III . |
| 5,119,504 | 6/1992 | Durboraw, III . |
| 5,383,225 | 1/1995 | Aguirre et al. . |
| 5,440,562 | 8/1995 | Cutler, Jr. . |
| 5,463,400 | 10/1995 | Tayloe . |
| 5,537,679 | 7/1996 | Crosbie et al. . |
| 5,561,838 | 10/1996 | Chandos et al. . |
| 5,574,660 | 11/1996 | Dickelman . |
| 5,619,525 | 4/1997 | Wiedeman et al. . |

Primary Examiner—Gregory C. Issing
Assistant Examiner—Dao L. Phan
Attorney, Agent, or Firm—Christensen O'Connor Johnson & Kindness PLLC

[57] ABSTRACT

A system for acquiring the beacon of a satellite and synchronizing data transmission between the satellite and a ground terminal is disclosed. The ground terminal conducts a search for a satellite to be acquired. The search may be based on previously developed information from which the location of the satellite can be predicted and, thus, limited to a small area of the sky, or cover a large area of the sky in accordance with a search routine. After the beacon of a satellite is acquired, the geographic area served by the satellite is determined. If the satellite does not serve the cell within which the ground terminal is located, a further satellite search is conducted, which may be based in part on information contained in the beacon of the acquired satellite. After the satellite serving the cell containing the ground terminal is acquired, a test is made to determine how long the satellite will continue to cover the cell. If the time period is short, communication waits until the next satellite to cover the cell is acquired. If the time period is long, communication is allowed to begin. The beacon is also used by the ground terminal to: (i) accurately time uplink data transmissions; (ii) estimate uplink Doppler, Doppler rate, and Doppler rate derivative and use this information to pre-compensate the carrier frequency of the uplink data transmissions for Doppler variations; and (iii) estimate the carrier frequency of downlink data transmission(s) by continuously tracking the beacon carrier frequency and scaling the result by a suitable scaling factor.

31 Claims, 23 Drawing Sheets

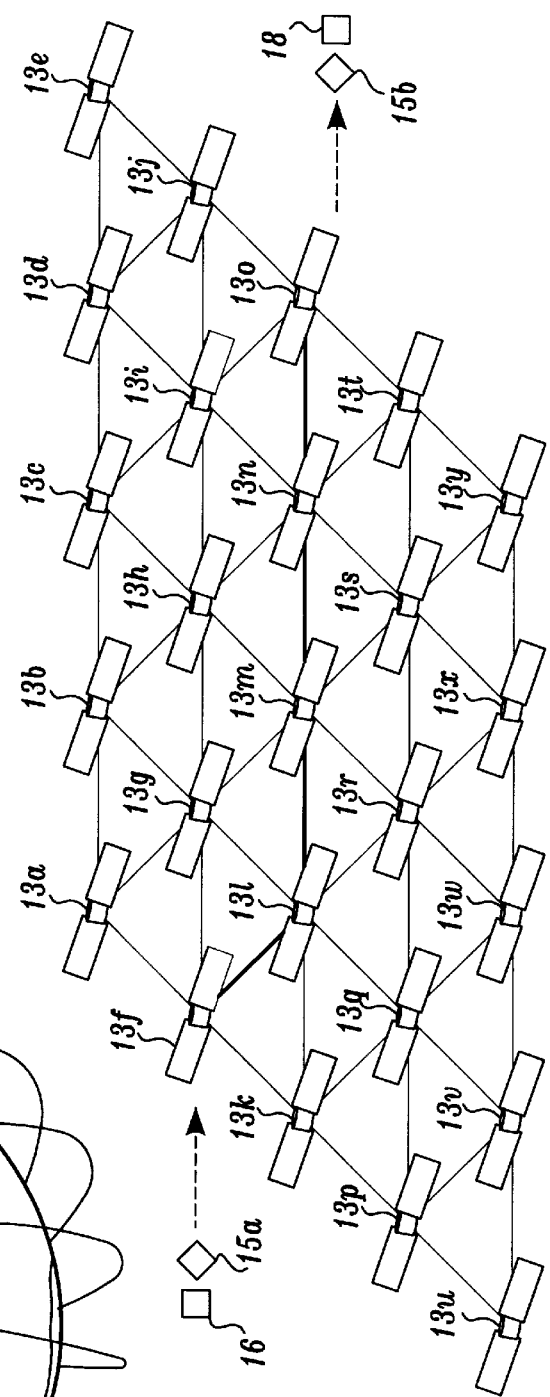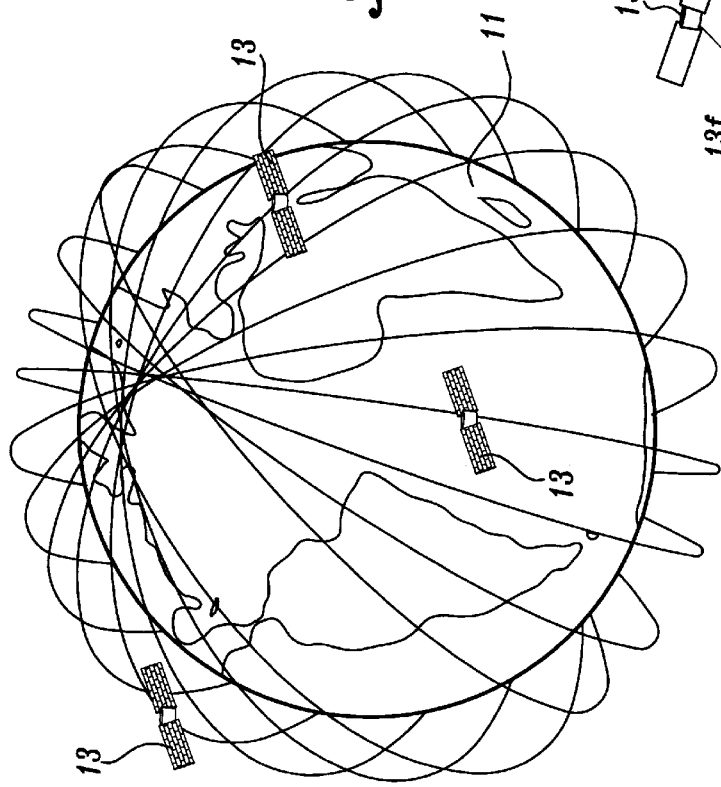

| SPATIAL SEARCH KNOWLEDGE | FROZEN | COLD | WARM |
|---|---|---|---|
| | NO A PRIORI KNOWLEDGE | ORBITAL PLANE KNOWLEDGE | SATELLITE POSITION KNOWLEDGE |
| GROUND TERMINAL STATUS | INITIAL INSTALLATION NO COMMUNICATION WITH NETWORK FOR 1 WEEK OR MORE | NO COMMUNICATION WITH NETWORK FOR PAST 1 WEEK OR LESS | NO COMMUNICATION FOR NETWORK FOR 1 HOUR OR LESS. |
| REQUIRED EPHEMERIS KNOWLEDGE | TERMINAL HAS NO KNOWLEDGE OF ANY SATELLITE IN CONSTELLATION | TERMINAL KNOWS THE POSTION OF AT LEAST TWO SATELLITES PER ORBITAL PLANE. SATELLITE POSITION AND VELOCITY MEASURED WITHIN PAST 1 WEEK. ASSUMES NO ORBITIAL MANEUVERS SINCE LAST POSITION UPDATE. | TERMINAL KNOWS THE POSITION AND VELOCITY OF AT LEAST TWO SATELLITES IN PLANE SERVICING IT PRIOR TO BEING TURNED OFF, AND IN PLANE TO THE EAST OF THE SERVICING PLANE. SATELLITE POSITION AND VELOCITY MEASURED WITHIN PAST 1 HOUR. |
| SEARCH SPACE | ૪ LATITUDE X ૪ LONGITUDE | ૪ LATITUDE X < ૪ LONGITUDE | << ૪ LATITUDE X << ૪ LONGITUDE |

*Fig. 8*

| BEACON CONSTITUENTS | BITS REQUIRED | | |
| --- | --- | --- | --- |
| | OPTION 1 (1 SATELLITE) | OPTION 2 (1+3 SATELLITES) | OPTION 3 (1+8 SATELLITES) |
| SATELLITE IDENTIFIER | 10 | 40 | 90 |
| SATELLITE POSITION & VELOCITY | 192 | 768 | 1728 |
| TIME WORD | 64 | 256 | 576 |
| CONTENTION CHANNEL IDENTIFIER | 5 | 5 | 5 |
| UNIQUE WORD | 21 | 21 | 21 |
| TOTAL BITS | 292 | 1090 | 2420 |

Fig. 15

LOW-EARTH ORBIT SATELLITE ACQUISITION AND SYNCHRONIZATION SYSTEM USING A BEACON SIGNAL

FIELD OF THE INVENTION

This invention relates to data communication systems and, more particularly, to satellite data communication systems.

BACKGROUND OF THE INVENTION

In recent years the need for global data networking capability has rapidly expanded. In order to meet this need, broadband satellite communication systems have been proposed as an alternative to land-based communication systems. One type of satellite data communication system is described in a variety of U.S. patents assigned to the assignee of this patent application, including U.S. Pat. Nos. 5,386,953; 5,408,237; 5,527,001; 5,548,294; 5,641,135; 5,642,122; and 5,650,788. These patents and other pending applications assigned to the assignee of this patent application describe a satellite communication system that includes a constellation of low-Earth orbit (LEO) satellites that implement an Earth-fixed cellular beam approach to transmitting data from one location on the Earth's surface to another location. More specifically, each LEO satellite has a communication "footprint" that covers a portion of the Earth's surface as a satellite passes over the Earth. The communication footprint defines the area on the Earth within which ground terminals can communicate with the satellite. Located within each footprint are a large number of cells. During the period of time a cell remains within the borders of a satellite footprint, ground terminals located in the cell transmit data to and receive data from the serving satellite. When a satellite reaches the end of its serving arc, another orbiting satellite is positioned to serve the Earth-fixed cell previously covered by the satellite reaching the end of its serving arc. During serving, the antennas of ground terminals located within the cells continuously point toward the serving satellite as it moves in orbit and antennas on the satellite point toward the cell during the time period within which the cell is allowed to transmit data.

Data to be sent from one location on the Earth to another location is transmitted from a ground terminal located within the cell to the satellite serving the cell via an uplink data channel. The data is routed through the constellation of LEO satellites to the satellite serving the cell within which the ground terminal of the designated receiver is located. The latter satellite transmits the data to the receiver ground terminal via a downlink data channel. Thus, the constellation of LEO satellites and the ground terminals form a satellite data communication network wherein each ground terminal and satellite forms a node of the network.

In order for a LEO satellite data communication system to be competitive, it must have a wide bandwidth. In the United States, the frequency spectrum is crowded at lower frequencies due to pre-allocated terrestrial and satellite users. Such a wide bandwidth is therefore generally only available in the gigahertz (GHz) range. In order to be competitive, it is also advantageous that the satellite data communication system be designed such that each ground terminal is able to rapidly acquire and synchronize its operation to the satellite serving the ground terminal. The orbit of the satellite in a LEO constellation causes each satellite to be visible to a ground terminal for only a limited period of time. In order to maximize the amount of time (and hence data) that the ground terminal can communicate with each satellite, it is therefore important to minimize the acquisition and synchronization period. The present invention is directed to a satellite acquisition and synchronization system that accomplishes these objectives.

SUMMARY OF THE INVENTION

In accordance with this invention a system for acquiring the beacon of a satellite serving a ground terminal and synchronizing data transmissions between the satellite and the ground terminal is provided. The ground terminal conducts a search for a satellite to be acquired. The search may be based on information resulting from prior data transmissions from which the location of the satellite can be predicted and, thus, limited to a small area of the sky, or cover a large area of the sky when no prediction information exists or the prediction information is unreliable. After the beacon of a satellite is acquired, the footprint of the satellite is determined. If the footprint of the satellite does not cover the cell in which the ground terminal is located, a further search is conducted, which may be based in part on information contained in the beacon of the acquired satellite. After the satellite serving the cell in which the ground terminal is located is acquired, the ground terminal is synchronized to the satellite.

In accordance with further aspects of this invention, after the beacon of the satellite serving the ground terminal cell is acquired, a test is made to determine how long the satellite will continue to serve the cell. If the time period is short, communication waits until the next satellite to serve the ground terminal cell is positioned for acquisition. If the time period is long, communication is allowed to begin.

In accordance with other aspects of this invention, the ground terminal uses the beacon to accurately point the antenna of the ground terminal toward the satellite serving the cell within which the ground terminal is located.

In accordance with further aspects of this invention, the ground terminal uses the beacon to accurately time uplink data transmissions.

In accordance with still other aspects of this invention, the ground terminal also uses the beacon to estimate uplink Doppler, Doppler rate, and Doppler rate derivative and uses the estimate to pre-compensate the carrier frequency of the uplink signal for Doppler and Doppler rate.

In accordance with yet other aspects of this invention, the ground terminal uses the beacon to continuously track downlink carrier frequency by continuously tracking the beacon carrier frequency and scaling the result by a suitable scaling factor.

As will be readily appreciated from the foregoing summary, the ground terminals of the LEO satellite data communication system use the beacon of the satellite serving a ground terminal in various ways to accomplish various results. Specifically, the beacon is used to enable accurate antenna pointing, uplink carrier frequency synchronization, data frame synchronization, and downlink carrier frequency synchronization. Such usage of the beacon enables the ground terminals to rapidly achieve network (e.g., satellite) acquisition and synchronization, and accurately time uplink traffic transmissions in order to maximize that data that may be transmitted to and from the serving LEO satellite.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a pictorial diagram showing the orbital paths of the satellites of a constellation of low-Earth orbit (LEO) satellites positioned to cover the entire surface of the Earth;

FIG. 2 is a plan view of a portion of the constellation of LEO satellites depicted in FIG. 1;

FIG. 8 is a table illustrating various satellite spatial search modes based on the amount of prior satellite position knowledge available to a ground terminal;

FIG. 15 is a table illustrating the bits required for the different beacon constituent options illustrated in FIG. 13, based on certain presumptions;

DETAILED DESCRIPTION OF THE PREFERRED EMBODIMENT

Figure 3:
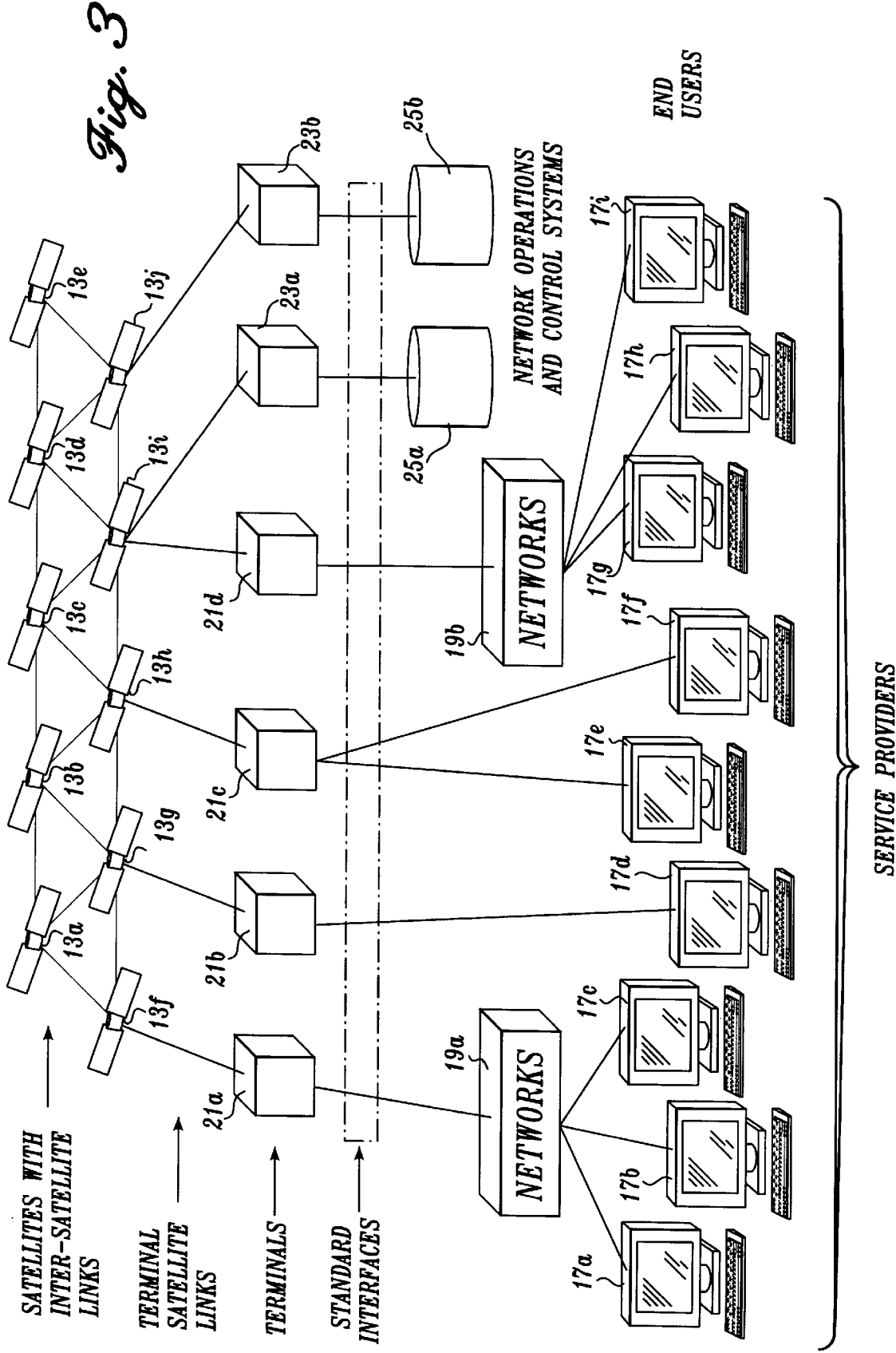
FIG. 3 is a pictorial view showing the various signal paths to and from a constellation of LEO satellites of the type depicted in FIGS. 1 and 2.

The present invention is directed to an acquisition and synchronization system using a beacon signal that is ideally suited for use in a low-Earth orbit (LEO) satellite communication network. A LEO satellite communication network includes a constellation of satellites orbiting the Earth such that a majority of the Earth is within the view of at least one satellite at any point in time. One proposed LEO satellite communication network employs 288 satellites, plus spares, located in 12 polar orbit planes. Each plane includes 24 satellites at an altitude of approximately 1,350 kilometers. The path of travel of the satellites of such a network is generally depicted in FIG. 1. More specifically, FIG. 1 depicts the Earth 11 surrounded by a plurality of rings that depict the orbital planes of the plurality of satellites 13.

FIG. 2 illustrates a number of the satellites 13a, 13b, 13c, ... that make up the constellation of satellites included in a LEO satellite communication network of the type illustrated in FIG. 1. The satellites are shown close to one another for illustrative purposes only. As shown in FIG. 2, a data signal 15a consisting of one or more data packets is transmitted from a ground terminal 16 to a first satellite 13f that forms part of the constellation of satellites via an uplink data channel. Depending on network traffic, the data packets are routed by various paths through the satellite constellation. For example, the receiving or uplink satellite 13f may forward one or more data packets to a second satellite 13l, which forwards the data packets to a third satellite 13m, which forwards the data packets to a fourth satellite 13n. The routing continues until the data packets reach the satellite 13o serving the ground terminal 18 that is to receive the data signal. The satellite serving the ground terminal, called the sending or downlink satellite, transmits the data packets as a data signal 15b to the ground terminal 18 via a downlink data channel. After receipt at the ground terminal, the data is forwarded to an end user. It will be appreciated that each of the data packets may be routed through different paths in the satellite constellation and may arrive at the end user in a different order than the order in which they were sent. Upon receipt at the receiving ground terminal, the data packets are reordered in the correct order.

FIG. 3 further illustrates the LEO satellite communication network. End users 17a, 17b, 17c, ... are connected either through networks 19a and 19b, or directly to ground terminals 21a, 21b, 21c. ... The networks 19a and 19b may, for example, be conventional switched public telephone system networks, corporate networks, or other proprietary networks.

Network operations and control systems 25a and 25b are shown as communicating with the satellites via separate ground terminals 23a and 23b. All of the ground terminals are designed to transmit signals to and receive signals from the constellation of satellites via uplink and downlink data channels. Preferably, the LEO satellite communication network employs Earth-fixed cellular beam technology. More specifically, as a LEO satellite passes over the Earth, the satellite's antenna beams define a region of the Earth, called a footprint. Since LEO satellites, in contrast to geosynchronous satellites, are moving with respect to the Earth, the region of the Earth covered by a satellite's footprint is constantly changing. Located within each footprint are a plurality of cells. In an Earth-fixed cellular beam system, a satellite's antennas are controlled to remain pointed at the cells located within the footprint as the satellite moves in orbit. As the servicing satellite moves, particular cells are handed off from the presently servicing satellite to the next servicing satellite. For a predetermined period of time each cell is serviced by the same satellite. An Earth-fixed cellular satellite communication system is believed to substantially reduce communication problems when compared to other satellite communication systems.

Figure 4:
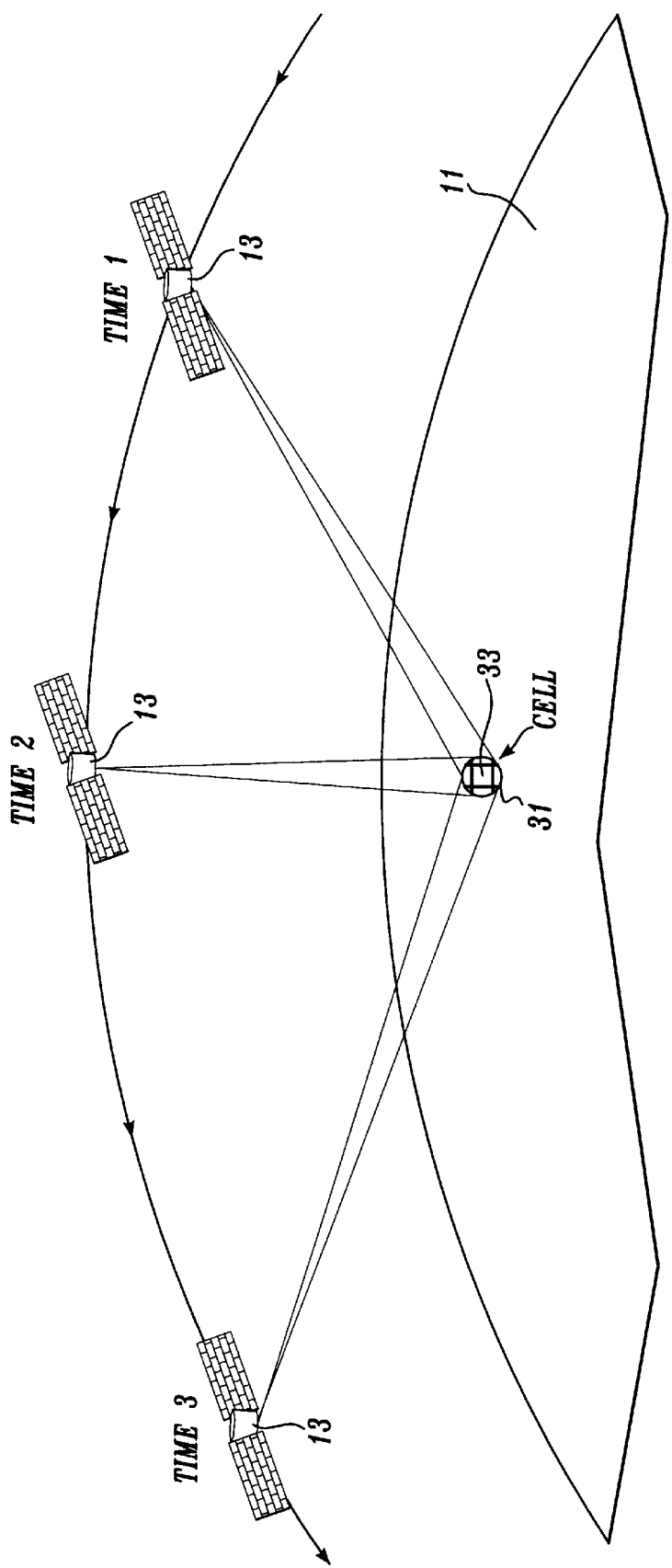
FIG. 4 is a pictorial view that shows a single LEO satellite communicating with a single earth cell in three sequential positions.

An Earth-fixed cellular beam system is illustrated in FIG. 4. As a satellite moves in orbit with respect to the Earth, the cells located within a footprint defined by the satellite's antennas are continuously serviced by the satellite. As shown, at the beginning of the arc, at a time 1, the boundary 31 of the beam of one of the antennas of the satellite covers a cell 33. At time 2, midway in the arc, the beam from the same or a different antenna is electronically or mechanically steered so that the cell is still covered by the same satellite. At the end of the arc, time 3, the beam from the same satellite still covers the cell 33. Since the satellite antenna footprint covers the cell 33 from time 1 to time 3, the cell with respect to the satellite is "fixed." Prior to time 1, the antenna of another (upstream) satellite covered the cell 33. At time 3, the antenna of a further (downstream) satellite will begin covering the cell 33. Rather than serving a single cell, a satellite antenna beam can be electronically controlled to service a group of cells by hopping from cell to cell located within the satellite footprint. Preferably, the uplink and downlink data channels use a time division multiple access (TDMA) air interface to coordinate spectrum sharing between terminals located within a cell. As cells leave satellite footprints, the appropriate antenna of the succeeding satellite picks up the prior cells, and the antennas of that satellite point at the cells from time 1 to time 3 as the satellite moves through its serving arc. The size of the satellite footprints is such that all regions of the Earth are covered at all points in time.

As is well known in the cellular telephone communication and other arts, data to be transmitted is transformed into digital "packets." Each packet includes a header and payload. The header includes packet address bits and the payload contains the data being transmitted.

While various transmission schemes can be utilized, preferably the cells include one or more terminals that assemble the data packets from a variety of sources into a stream of data packets for transmission to the satellite serving the cell. This allows the bandwidth to be allocated to the end users in a variety of ways. For example, by paying a higher fee, an end user can obtain a priority portion of the available bandwidth. Other less priority-sensitive messages can be communicated at a lower cost. On the uplink, each satellite includes a plurality of antennas designed to receive data from a plurality of cells in a sequential manner. In contrast to the uplink transmission of data, preferably downlink data is transmitted as a burst of data packets. Each receiving terminal determines which packets are intended for it based on information contained in the header.

Figure 5:
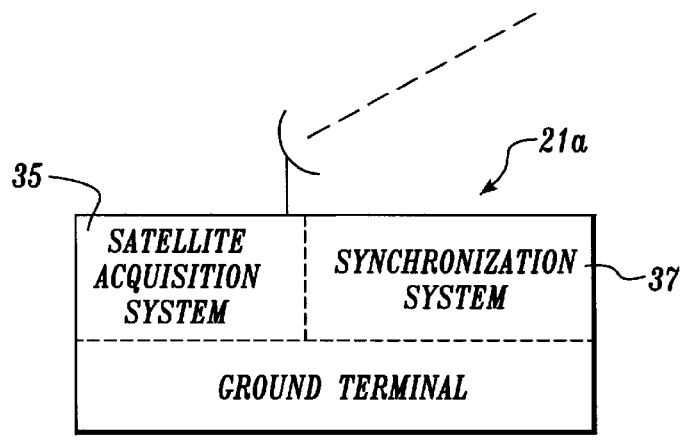
FIG. 5 is a functional block diagram of a satellite acquisition and synchronization system formed in accordance with the invention.

In order for a satellite communication network of the type illustrated in FIGS. 1–4 to send data in a cost-effective manner, when compared to entirely land-based commercial networks, the bandwidth of the satellite-to-ground terminal links must be relatively large, e.g., 500 MHz. One available frequency range offering such a bandwidth is in the Gigahertz range, specifically the 18.8 GHz to 19.3 GHz portion of the Ka band. Even with such a broad bandwidth, however, maximizing the amount of data that may be transmitted requires, among other things, that the ground terminal quickly acquire and remain synchronized with a new servicing satellite. More specifically, ground terminals must be able to: (1) rapidly acquire the satellite serving the ground terminal when data communication is to begin; (2) accurately time uplink data communication; (3) pre-compensate uplink carrier frequency to account for Doppler shift; and (4) continuously track downlink carrier frequency to receive bursts of downlink traffic. The present invention allows the ground terminal to accomplish all of these functions based on a single beacon signal received from a satellite. That is, each satellite 13a, 13b, 13c, . . . contains a beacon transmitter for transmitting a beacon signal that is received by the ground terminals 21a, 21b, 21c, . . . . As will be discussed in additional detail below, the beacon signal contains sufficient information for a terminal to determine if it has acquired the satellite serving the cell within which the ground terminal lies, the ephemeris (position and velocity) of the satellite, a clock that can be used to establish frame timing, and the identity of the contention channel, i.e., the channel used to request service. As shown in FIG. 5, the ground terminals 21a, 21b, 21c, . . . and 23a, 23b, . . . each include a satellite acquisition system 35 and a synchronization system 37 formed of software and hardware components. The satellite acquisition system 35 and synchronization system 37 utilize the received beacon signal to accomplish the foregoing functions, preferably in the manner described below.

1. Satellite Acquisition

Satellite acquisition involves spatially locating a satellite in the region above a ground terminal through reception of the satellite's beacon signal, determining whether the satellite serves a terminal's geographic area, and determining the communication channel used to request service (called the contention channel). Satellite synchronization involves synchronizing the satellite and the terminal in both time and frequency. Satellite acquisition and synchronization are required each time a terminal begins a new communication sequence.

Figure 6:
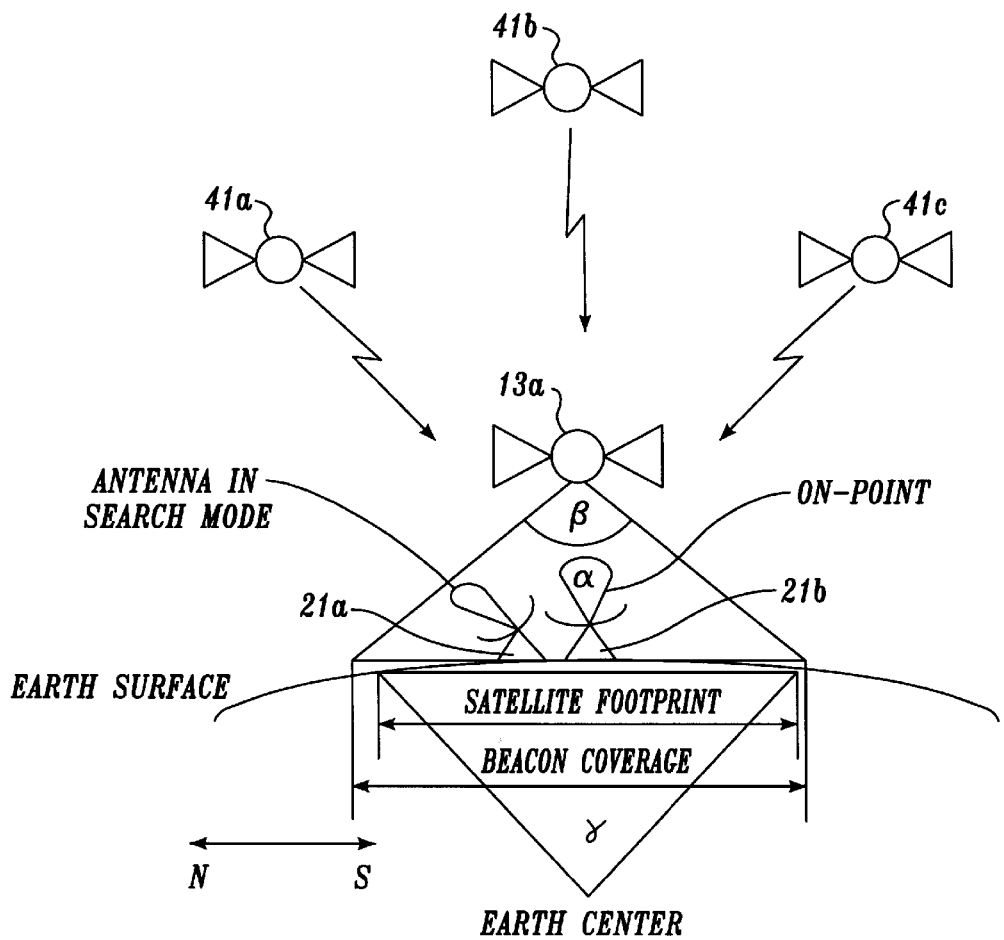
FIG. 6 is a pictorial diagram illustrating the relationship between the communications footprint of a satellite, the coverage area of a satellite beacon, and the relationship between a LEO satellite, a ground station, and global positioning system (GPS) satellites.

The present system for acquisition and synchronization with a satellite requires the ground terminals 21a, 21b, 21c, 21d, . . . and 23a, 23b, and the satellites, 13a, 13b, 13c, . . . to have accurate knowledge of their respective positions. In accordance with the invention, signals produced by Global Positioning System (GPS) satellites are used by the LEO satellites to accurately determine their positions in space. More specifically, as shown in FIG. 6, the LEO satellites 13a, 13b, 13c, . . . receive GPS signals from the GPS satellites 41a, 41b, 4c, . . . and use the GPS signals to determine their position. The GPS signals are also used to synchronize the time and frequency of all of the satellites 13a, 13b, 13c, . . . . The location of the ground stations 21a, 21b, 21c, . . . 23a, 23b may similarly be determined using GPS signals. Preferably, however, each ground station is programmed with its precise location when the ground station is installed at a fixed position on the Earth.

As depicted in FIG. 6, each satellite 13a, 13b, 13c, . . . transmits a beacon signal in a beam towards the Earth. Obviously, the beacon transmitted by each satellite must cover all of the ground terminals located within a satellite's footprint. This means that the beacon must have a predetermined beam width $\beta$, i.e., the beacon must cover a cone having an apex angle equal to $\beta$. In the case of a satellite system of the type described above, i.e., one including 288 satellites, plus spares, located in 12 polar orbit planes, each plane including 24 satellites at an altitude of approximately 1,350 kilometers, $\beta$ is equal to 80°. An 80° beam width covers an area on the Earth that is slightly larger than the area of the satellite footprint centered at any longitudinal along the equator. The size of the satellite footprint is based on the number of satellites in orbit, each of which covers a predetermined angle, $\gamma$, with respect to the center of the Earth. In the case of 24 equally spaced satellites, $\gamma$ is equal to 15°. Obviously, satellite footprints at latitudes other than the equator overlap, whereby ground terminals can be "illuminated" by multiple beacons. As will be better understood from the following description, the confusion that could occur as a result of such multiple illumination is avoided by including satellite information in the beacon signals, such as the position of the satellite transmitting the beacon. The ground terminals use the satellite information to determine what satellite is the one and only one serving the cell within which a ground terminal lies.

As also shown in FIG. 6, each terminal has a high gain antenna having a beam width, $\alpha$, that is used to acquire and track the beacon of the serving satellite. The antennas of two terminals 21a and 21b are illustrated in FIG. 6. The antenna of one terminal, 21a, is shown in a search mode and the antenna of the other terminal, 21b, is shown pointed toward a satellite 13a, which is illustrated as lying directly overhead. While various antenna beam width angles $\alpha$ can be used, a suitable angle is 3.5°.

Figure 7:
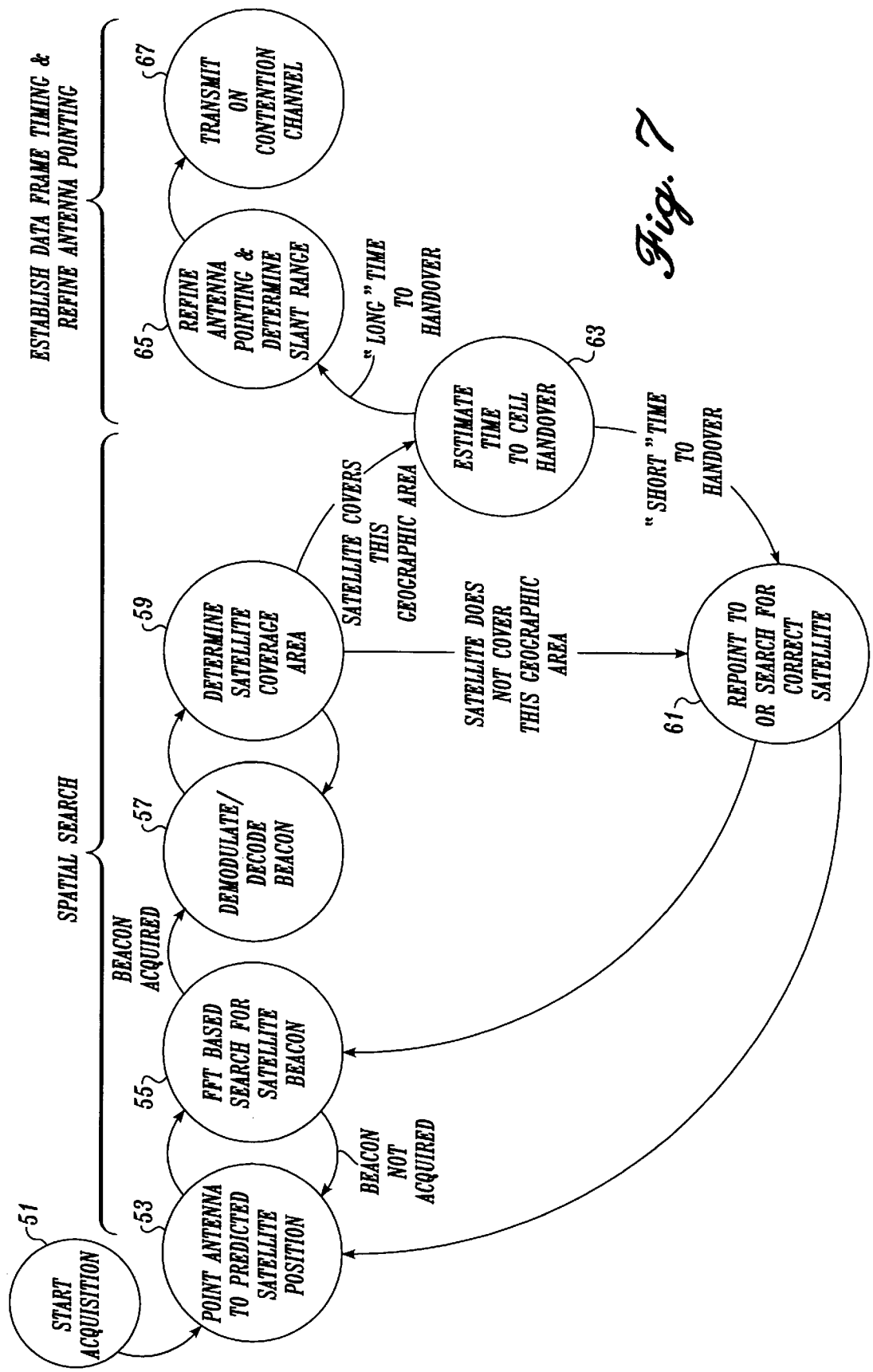
FIG. 7 is a pictorial diagram illustrating the satellite acquisition aspect of the invention using a beacon signal.

FIG. 7 illustrates the LEO satellite acquisition process. In general, the process begins when a terminal conducts a spatial and frequency search for a satellite beacon. After a satellite beacon is detected, the terminal demodulates and decodes the beacon, and uses the information contained in the beacon to determine the geographic area covered by the satellite and if the cell within which the terminal lies falls in the geographic area. If the acquired satellite does not serve the cell, the terminal searches for another satellite. Once the satellite serving the cell within which the ground terminal is located has been acquired, the ground terminal estimates the time to handover to another satellite. If the acquired satellite is about to stop serving the cell within which the ground terminal lies, i.e., the satellite is about to go out of view, the terminal points toward the rising satellite, or searches for it. After acquiring a serving satellite with a relatively long time to handover, the terminal refines its antenna pointing direction, establishes timing and data frame synchronization, and begins data transmission on the contention channel. Refining antenna point is necessary to minimize pointing losses. Establishing timing and frame synchronization is required to accurately time the service request data transmission on the contention channel.

Turning now to a more detailed description of the LEO satellite acquisition process shown in FIG. 7, at the start of the acquisition process 51, the antenna of the ground station is pointed to a predicted satellite position. As will be better understood from the following description, the prediction is based on when a satellite was last communicating with the acquiring ground terminal. It may be the first position in a search grid, or may be based on previously acquired satellite information. In any case, after pointing in the predicted satellite direction, a fast fourier transform (FFT)-based search for the satellite beacon is conducted 55. If the beacon is not detected, the antenna is pointed to another predicted satellite position 53. This sequence is repeated until a satellite beacon is detected. After detection, the beacon is demodulated and decoded 57. Satellite information contained in the beacon is used to determine the satellite coverage area 59. As will be better understood from the following description, depending upon the nature of the satellite information contained in the beacon, if the satellite does not cover the geographic area in which the cell containing the terminal is located, it may contain information about the coverage area of other satellites. If the satellite does not cover the cell within which the terminal is located, depending upon the satellite information contained in the beacon, the antenna of the ground terminal is either pointed toward the appropriate satellite position and another FFT search conducted for the satellite beacon, or pointed toward another predicted satellite position 61 and the foregoing steps repeated.

If the acquired satellite covers the cell within which the terminal is located, an estimate of the time to handover the cell within which the terminal is located to another satellite is made 63. If the time is short, the antenna of the ground terminal is either pointed toward the handover satellite position and another FFT search is conducted or pointed toward another predicted satellite position 61 and the foregoing steps repeated.

If the time to handover is long, the antenna pointing direction is refined for accuracy and the slant range to the satellite determined. More specifically, the GPS-based satellite position information and the terminal position information is used to determine the slant range between the satellite and the ground terminal. In this regard, as will be better understood from the following description, part of the satellite information contained in the beacon is the position of the satellite. The slant range information is used to establish data frame timing.

Examining the initial spatial search identified in FIG. 7 by reference numbers 51–55 in more detail, it is desirable to minimize the amount of time it takes for the ground terminal to acquire a satellite. The speed with which the satellite is acquired depends on the information known to the ground terminal searching for a satellite. For purposes of discussion, three possible search modes are identified depending on the state of the ground terminal. These search modes will be referred to as "frozen," "cold," and "warm."

As shown in FIG. 8, the frozen search mode is defined as an initial ground terminal installation or where no communication has occurred between the ground terminal and the satellite network for a predetermined period of time—one week or more. Further, the ground terminal has no ephemeris information regarding any satellite in the constellation. The frozen mode causes the ground terminal to search a large region of space. The region is the maximum field of view of the cell within which the ground station lies, which is the same as the satellite footprint at the equator, i.e., $\gamma$ or 15° latitude and longitude for the satellite constellation example described above.

The cold search mode presumes some satellite orbital plane knowledge, but no communication with the satellite network for a period of time less the predetermined period, i.e., less than one week. Specifically, the ground terminal knows the position of at least two satellites per orbital plane; satellite position and velocity were made available to the ground terminal within the last week; and no satellite orbital maneuvers have taken place since the last position update. The cold search mode requires the same degree of latitude, i.e., $\gamma$ or 15°, but substantially less longitude ($<\gamma$)—3° for example.

The warm search mode presumes that: (i) there has been no communication with the satellite network for a relatively short period of time—one hour or less—but that there was communication prior to this short period; (ii) the ground terminal knows the position and velocity of at least two satellites in the plane serving the ground terminal prior to communication termination and in the plane to the east of the serving plane; and (iii) satellite position and velocity information has been provided to the ground station within the last hour. In this case, the search routine can cover a substantially smaller region of space, i.e., a region of space that is <<γ in both latitude and longitude—0.6° latitude by 0.6° longitude, for example.

In summary, the frozen search mode assumes the terminal either has never been used before or has had no communication with the satellite network for at least a predetermined period of time—one week. As a result, the ground terminal has no ephemeris updates for at least the past week, and does not know the latitude or longitude of the satellite serving its area. The cold search mode assumes that the terminal has not been used during the last week, but before that has been used extensively and has built up an ephemeris database that consists of ephemeris data for at least two satellites per orbital plane. Based on this knowledge, the ground terminal can predict the longitude of the satellites serving its geographical area to within a predetermined range, i.e., three degrees, but cannot predict the satellite's latitude. The warm search mode assumes that the ground terminal has not communicated with the satellite network for less than an hour, and before that has been used long enough to know the position of at least two satellites in the plane that has been serving the ground terminal and the plane to the east of the serving plane. Knowledge of the plane to the east is needed in case of a cross-plane handover.

Figure 9B:
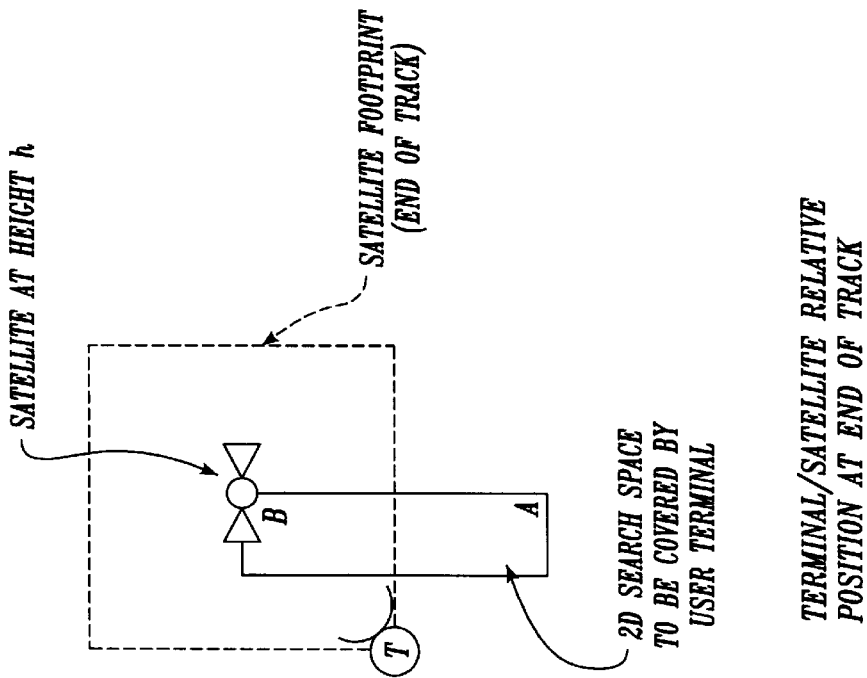
FIGS. 9A and 9B are top views of a satellite footprint and terminal space search based on the assumption that the satellite moves from point A to point B at height h.
Figure 9A:
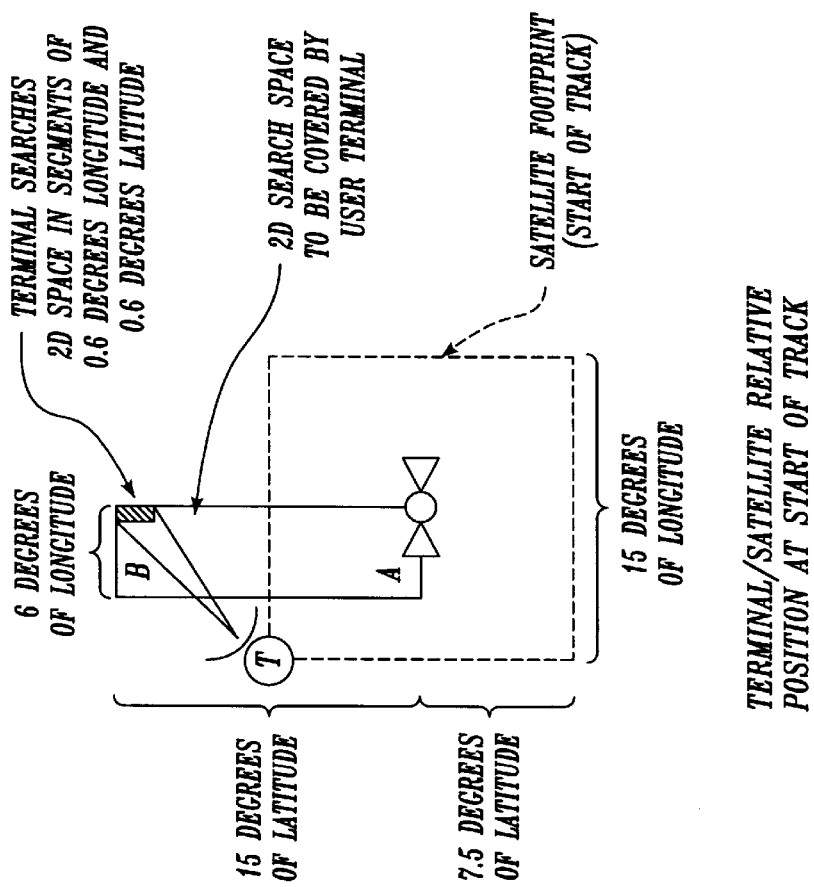
Figure 10:
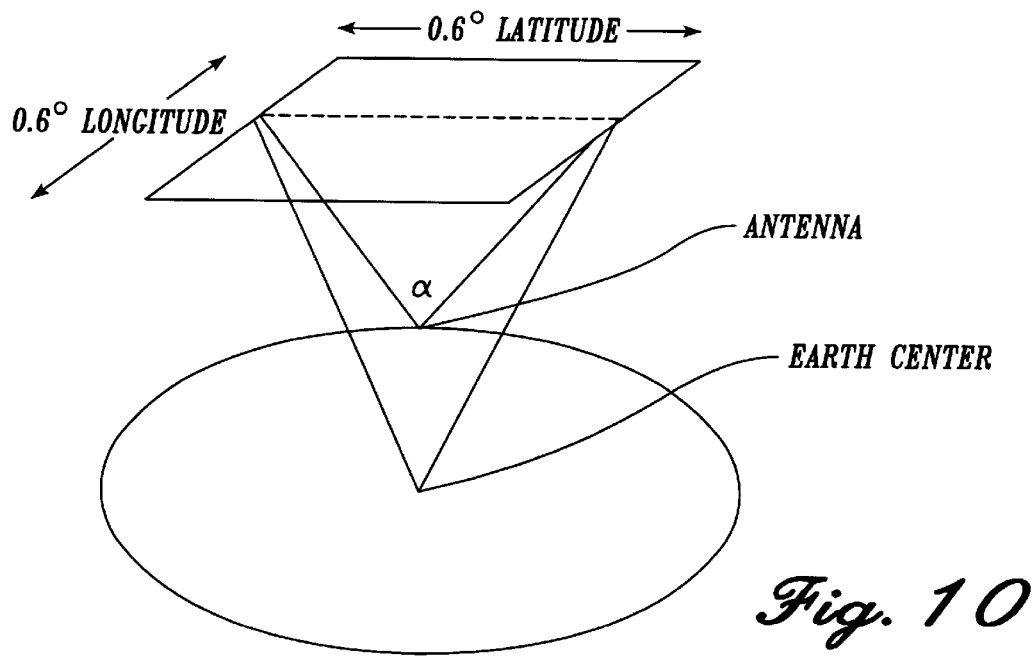
FIG. 10 is a pictorial diagram illustrating approximate relationships between search grid dimensions and antenna beam width.

FIGS. 9A, 9B, and 10 depict a spatial space search using the cold search mode. As noted above, the cold search mode covers a spatial region 3° longitude by 15° latitude for the satellite network example described herein, i.e., a satellite network comprising 288 satellites in 12 orbital planes at an altitude, of approximately 1,350 kilometers. The searched space is divided into a search grid, one segment of which is shown as a lightly shaded box in FIG. 9A. The antenna of the ground terminal is pointed to the center of each grid segment in sequence. As shown in FIGS. 9A and 10, the grid segment size is, preferably, equal to the size of the region of space searched during warm acquisition, i.e., 0.6° latitude by 0.6° longitude.

As previously discussed with respect to FIG. 7, when the antenna terminal is pointed to the center of a grid segment a fast fourier transform (FFT) is performed to determine if a beacon signal is being emitted by a satellite located within the grid segment. When a satellite is located in a grid segment, but not at the center, there is a pointing loss and frequency prediction error, i.e., a Doppler and Doppler rate prediction error. For each grid segment there will therefore be a frequency range surrounding the transmitted beacon frequency that must be searched in order to detect the Doppler shifted beacon frequency at the ground terminal.

Figure 11A:
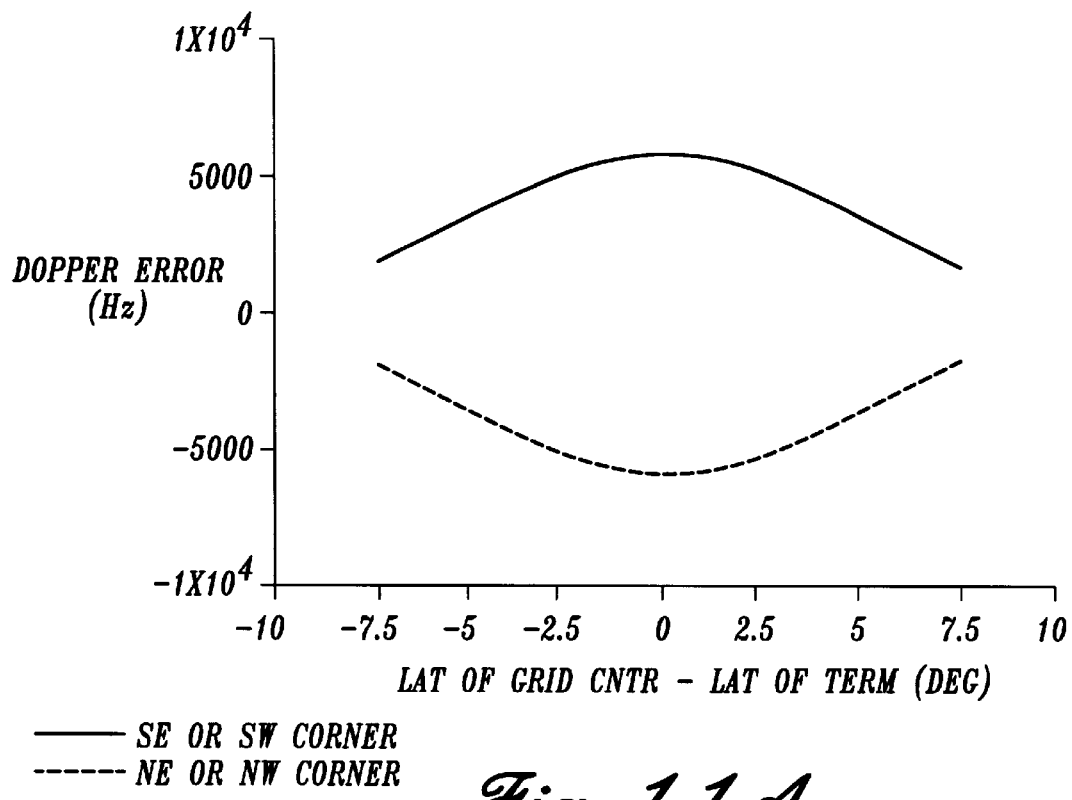
FIGS. 11A and 11B are diagrams illustrating the Doppler and Doppler rate error that occurs when an antenna is pointing at the center of a grid location and the satellite is located elsewhere in the grid.
Figure 11B:
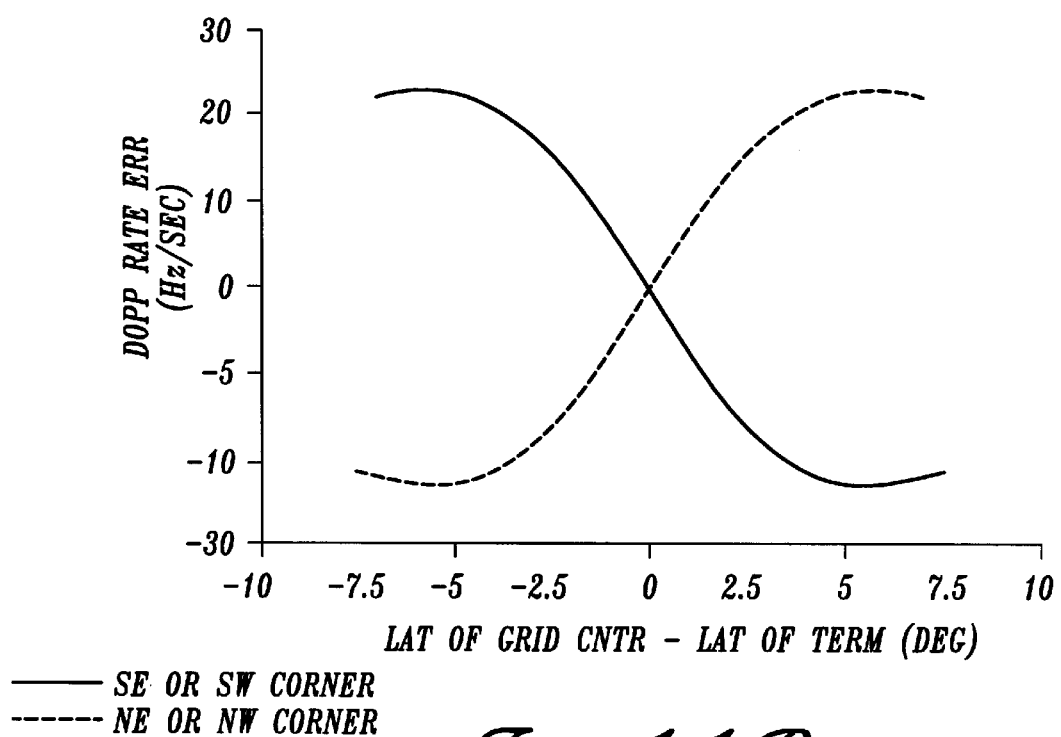

The maximum prediction error occurs when the satellite is at one of the corners of the grid segment. The magnitude of the error is a function of grid segment size, with larger grid segments resulting in higher error due to the corners being further away from the center. FIGURES 11A and 11B show the Doppler and Doppler rate error for 0.6° latitude by 0.6° longitude grid segments belonging to a search strip at the same longitude as the terminal. The horizontal axis of each graph shows the search grid segment latitude relative to the latitude of the terminal. Zero on the horizontal axis indicates that the search grid segment center is at the same latitude and longitude as the terminal. A positive horizontal axis value indicates that the search grid segment center is north of the terminal along the same longitude. A negative horizontal axis value indicates that the search grid segment center is south of the terminal along the same longitude. The top curve in FIG. 11A shows the Doppler error when the antenna is pointing to the center of the grid segment and the satellite is at either the SW or SE corner of the grid segment. The bottom curve shows the error when the antenna is pointed to the center and the satellite is at the NE or NW corners. FIG. 11B shows the Doppler rate error.

In order to detect signals over the entire frequency range, the FFT sampling rate must be at least twice the highest Doppler shift. Preferably, the FFT is preceded by a down-conversion process that includes a predict driven numerically controlled oscillator (NCO) that is tuned to remove the Doppler and Doppler rate error with respect to the center of the grid segment. The FFT bin size should be large enough to avoid smearing, preferably a bin size greater than the maximum Doppler rate times the FFT duration. The signal level in each FFT bin is compared against a preset threshold. The beacon is detected when one or more FFT bins have a signal level greater than the threshold. For a fixed FFT size, the detection probability can be increased by increasing the sample signal to noise ratio (SNR) and for a fixed sample SNR the detection probability can be increased by increasing the FFT size. Preferably, these parameters are traded off in a manner that allows the system to operate at the lowest sample SNR to enable the system to minimize the received power to noise ratio ($P/N_0$). For a given $P/N_0$ and sample SNR, there is a maximum Doppler shift that can be supported which, in turn, means that there is a maximum grid segment size that can be used. The finer the grid segment size, the longer it takes to cover the space to be searched and find a satellite.

Figure 13:
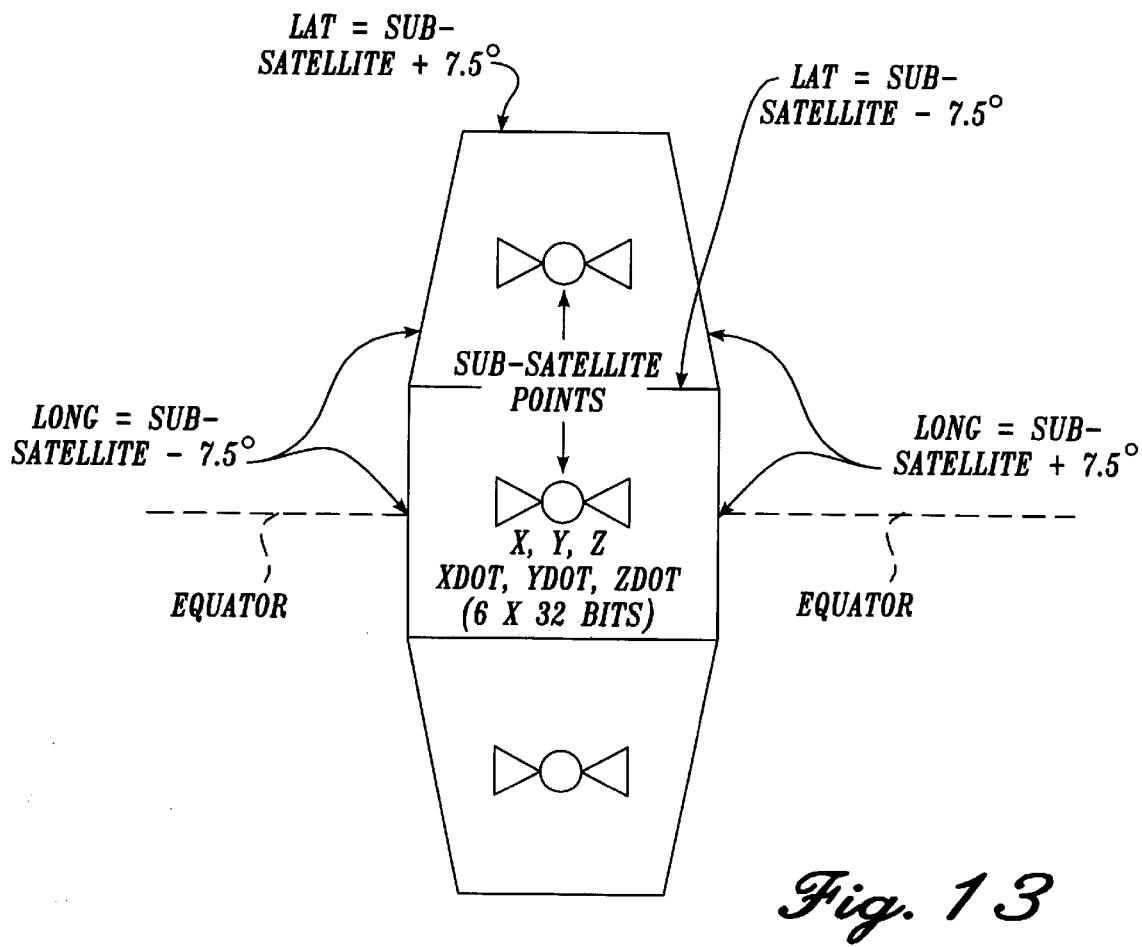
FIG. 13 is a pictorial diagram illustrating satellite footprints at different latitudes.
Figure 12:
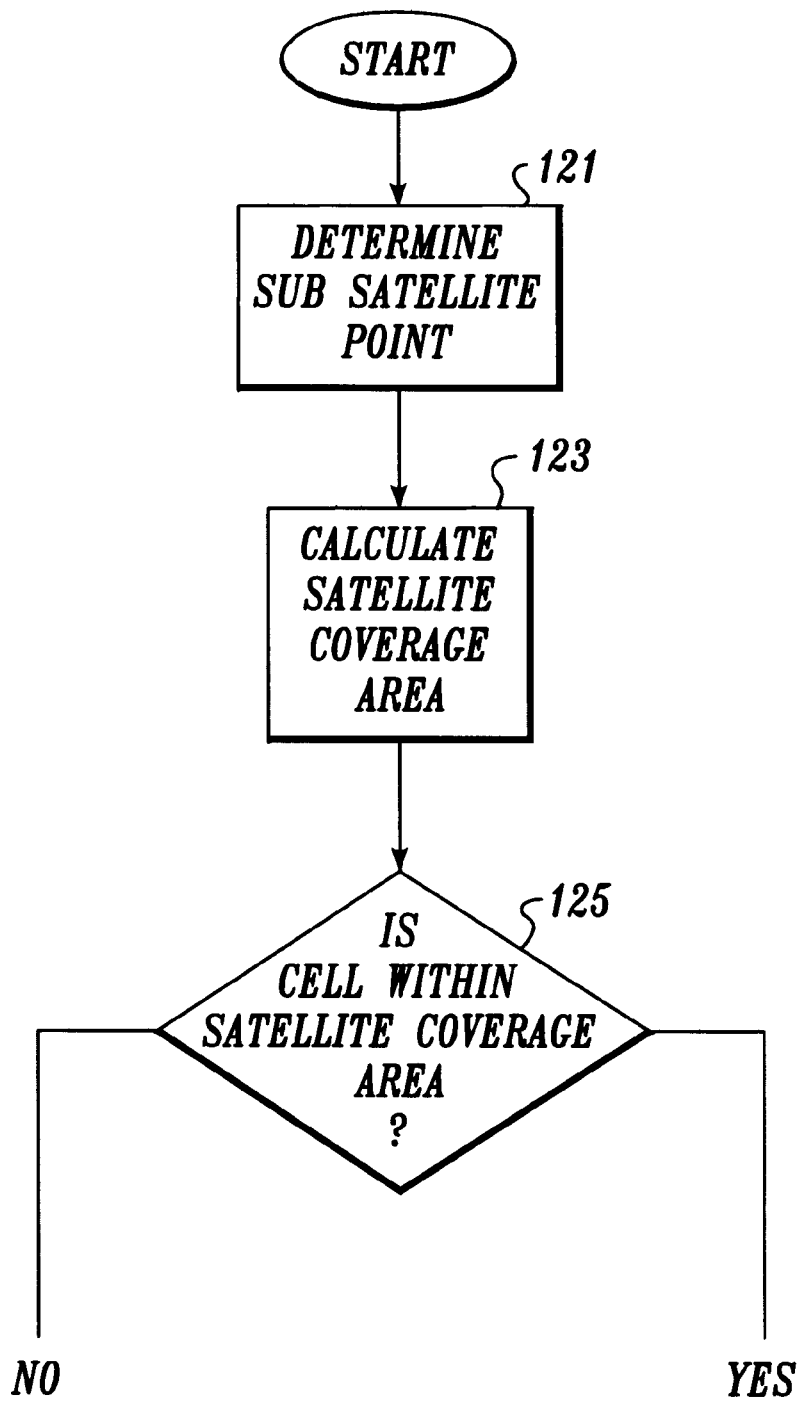
FIG. 12 is a flow diagram illustrating the steps used to determine if a cell lies within a satellite coverage area.

If a satellite is detected in the grid segment using the above method, satellite information contained in the satellite's beacon is evaluated to determine if the satellite is serving the cell in which the terminal is located. FIGS. 12 and 13 illustrate how a ground terminal determines if an acquired satellite is the one serving the cell within which the ground terminal is located. As noted above and described below with respect to FIG. 15, the position of the satellite transmitting the beacon is encoded in the beacon signal. Based on the satellite's position, the ground terminal determines the satellite's subsatellite point. See block 121 The subsatellite point is the point lying on the Earth's surface along a line running between the satellite and the center of the Earth. Based on the subsatellite point, at block 123, the satellite coverage area is determined.

FIG. 13 graphically depicts the method of determining a satellite coverage area. As shown in FIG. 13, the geographic area covered by a satellite is relatively square at the equator and changes into a trapezoidal shape away from the equator. The satellite positional information contained in the beacon plus information about the location of the ground terminal allows the ground terminal to determine the exact size of the satellite footprint and if the center of the cell within which the ground station is located lies within the footprint. Although the shape of the satellite footprint changes with the latitude of the subsatellite point, each satellite's footprint has boundaries that are a constant distance (in terms of Earth-fixed latitude and longitude) away from the subsatellite point. Satellite footprint boundaries may therefore be readily computed by calculating the subsatellite point of each satellite based on the position of the satellite and adding constant amounts to the subsatellite point to determine the boundary locations.

Returning to FIG. 12, once the satellite coverage area is determined a test is made to determine if the cell containing the ground terminal lies within the satellite coverage area. See block 125. If the answer is yes, the sequence of steps depicted in FIGS. 16, 17, or 18 and described below are followed. If the answer is no, the antenna is pointed toward another grid segment and the search continued for another satellite as shown in FIG. 7 and described above. When another satellite is acquired, the sequence shown in FIG. 12 is repeated.

As noted above, when a ground terminal first acquires a satellite, it is possible to acquire a satellite not serving the cell within which the terminal lies before acquiring the satellite that serves the cell. In this regard, attention is directed to FIG. 14, which shows four Earth-fixed cells 31a, 31b, 31c, and 31d all positioned to communicate with a satellite 13m. That is, the communicating satellite 13m lies within the field of view of all four cells 31a, 31b, 31c, and 31d. The communicating satellite 31m is surrounded by eight other satellites 13g, 13h, 13i, 13l, 13n, 13q, 13r, and 13s. For purposes of illustration, the direction of satellite travel in FIG. 13 is denoted from top to bottom and the Earth's rotation is from left to right. In addition to the communicating satellite 13m, three additional satellites lie within the field of view of each of the Earth-fixed cells.

Figure 14:
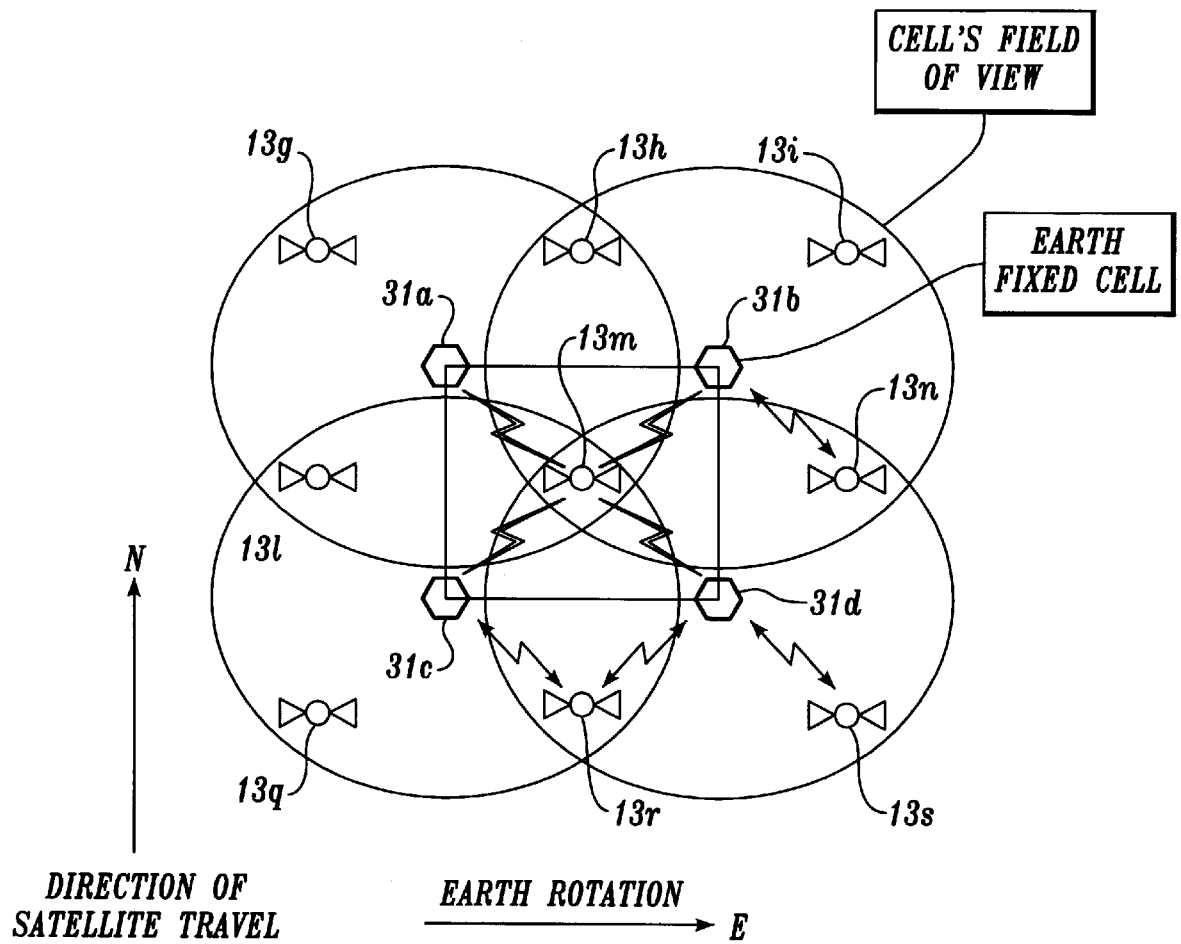
FIG. 14 is a pictorial diagram comparing beacon constituent options.

At a minimum, the beacon produced by each satellite must contain enough satellite information for a terminal to determine if it has acquired the satellite serving the cell within which the ground terminal lies, the ephemeris (position and velocity) of the satellite, a clock that can be used to establish frame timing, and the identity of the contention channel, i.e., the channel used to request service. Beyond this minimum information, the beacon may include information about adjacent satellites, which can be used to repoint the antenna of the terminal toward the satellite serving the cell within which the terminal lies, or enable repointing of the terminal's antenna when handover is required. Increasing the amount of satellite information contained in the beacon reduces the amount of time it takes a ground terminal to acquire an adjacent satellite serving the ground station. For example, as shown in FIG. 14, prior to acquiring the serving satellite 13m a ground terminal located within one of the Earth-fixed cells 31a could have acquired any of three other satellites within the cell's field of view, 13g, 13h, or 13l. If the beacon only contains information about the acquired satellite, the ground terminal would have to re-execute a complete search routine and, potentially, could locate the other two incorrect satellites prior to acquiring the satellite 13m serving the geographic area within which the Earth-fixed cell 31a lies. In contrast, if the beacon contains information about other nearby satellites, acquiring the beacon of the wrong satellite results in the ground terminal receiving information that can be used to immediately point the ground terminal's antenna toward the correct satellite.

There are three meaningful options that need to be considered when determining the type of satellite information to be included in the beacon. Option 1 covers a beacon containing information only about the acquired satellite. This is the minimum information necessary for a ground terminal to acquire a LEO satellite and establish data frame timing. Option 2 covers a beacon containing information about the acquired satellite plus three adjacent satellites that are potential handover candidates. This beacon information allows a ground terminal to acquire a LEO satellite and establish data frame timing, if the acquired satellite is the one serving the cell within which the ground terminal lies.

Option 2 also allows a terminal to track the position of satellites that could be assigned at the time of handover. Option 3 covers a beacon containing information about the acquired satellite plus the eight satellites surrounding the acquired satellite, all of which are potential handover candidates, or potential "false" acquisition candidates.

FIG. 15 is a table that, based on certain assumptions, illustrates the relative magnitude of the satellite information that must be contained in the beacon for each of the three options. The beacon information constituents are: satellite identifier, satellite ephemeris (e.g., position and velocity), time word, contention channel identifier, and unique word. The function and purpose of the unique word is described below. Each constituent is updated at some predetermined rate. Preferably, the update rate for all of the constituents except the unique word is the same—5 seconds, for example. The unique word is updated at a faster rate— 0.11506 seconds, for example. The update rate affects both satellite acquisition time and uplink and downlink margin. While a slower update rate increases uplink and downlink margin, it also increases satellite acquisition time. The satellite identifier relates satellite position and velocity at any given time to the corresponding satellite.

By way of example only, the table lists: 10 databits for satellite identity; 192 databits per satellite for satellite ephemeris, i.e., satellite position and velocity; 64 databits (per satellite) for time word; and 5 databits for contention channel identification, i.e., to identify the channel to be used by the ground terminals to request service. In addition, 21 databits are used to identify a unique word whose purpose is described below. With respect to satellite ephemeris, the number of bits used to represent each component of a three-dimensional position and velocity coordinate system is 32. While the databit choices set forth in FIG. 15 are to be taken as exemplary, not limiting, it is clear from FIG. 15 that Option 2 requires a greater bandwidth (more than three times) than Option 1, and Option 3 requires a greater bandwidth than Option 2 (more than twice).

Figure 16:
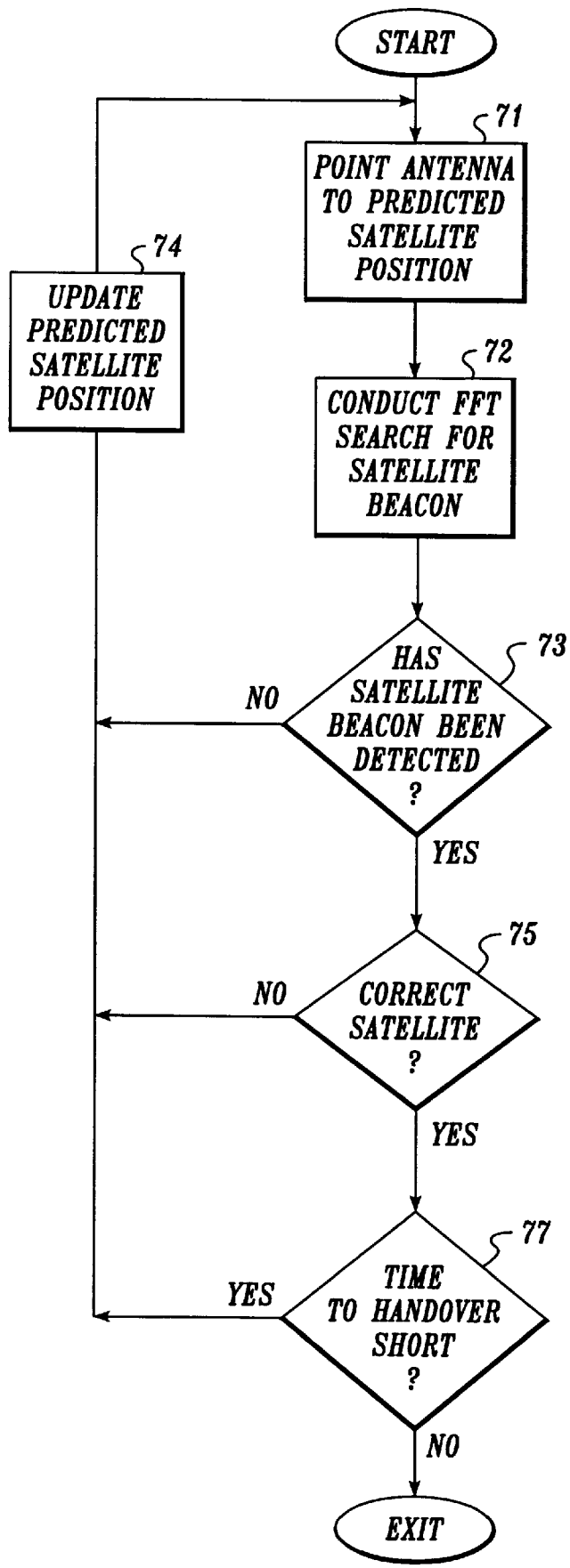
FIG. 16 is a flow diagram illustrating a first beacon constituent option.

FIG. 16 is a functional flow diagram illustrating the steps performed by a system implementing Option 1. Initially, as previously described in connection with FIG. 7, the antenna of the ground terminal is pointed toward a first predicted satellite position, which may be the first segment of a search grid. See block 71. After the antenna is pointed, an FFT search is conducted for a satellite beacon. See block 72. At block 73, a test is performed to determine if a satellite beacon has been detected. If a satellite beacon has not been acquired, the predicted satellite position is updated (block 74) and the antenna pointed toward the next predicted satellite position (block 71), i.e., the next segment in the search grid. When a satellite beacon is acquired, at block 75, a test is made to determine if the correct satellite has been acquired. If the correct satellite has not been acquired, the predicted satellite position is again updated (block 74) and the antenna repointed toward the new position (block 71)— the next segment in the search grid. When the correct satellite is acquired, at block 77, a test is made to determine if the time to handover is short. If the time to handover is short, the predicted satellite position is updited again and the foregoing steps repeated. If the time to handover is not short, the process terminates.

Figure 17:
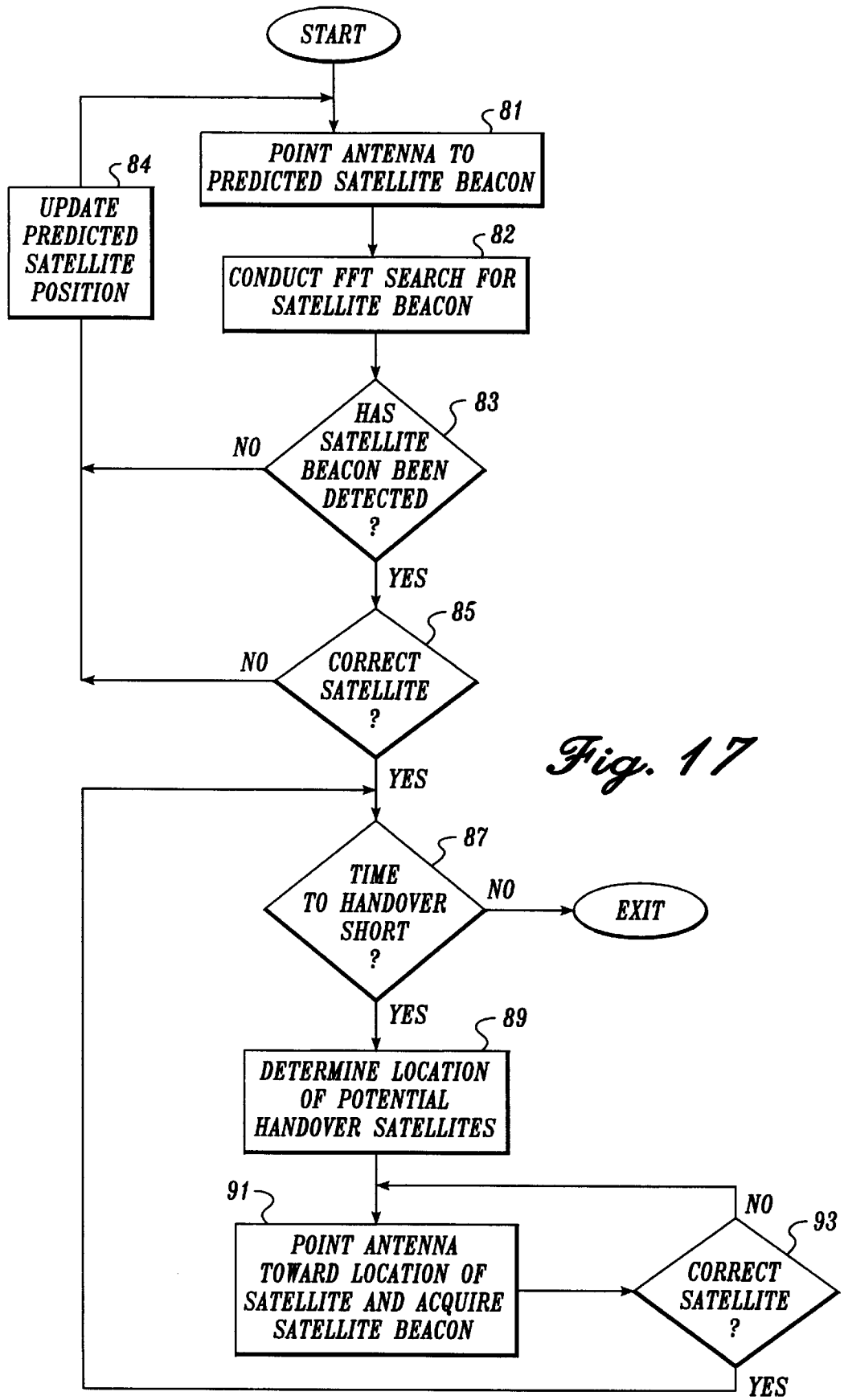
FIG. 17 is a flow diagram illustrating a second beacon constituent option.

FIG. 17 is a functional flow diagram illustrating the steps performed by a system implementing Option 2. As before, initially, the antenna of the ground terminal is pointed to a predicted satellite position. See block 81. Next, an FFT search is conducted for a satellite beacon. See block 82. Then, at block 83, a test is made to determine if a satellite beacon has been detected. If no satellite beacon has been detected, the predicted satellite position is updated (block 84) and the antenna of the ground terminal pointed toward the new position.

When a satellite beacon is detected, a test is made to determine if it is the correct satellite. See block 85. If the acquired satellite is not the correct satellite, i.e., the satellite serving the cell within which the ground terminal is located, the predicted satellite position is updated (block 84) and the antenna of the ground terminal pointed toward the new position.

If the correct satellite has been acquired, a test is made to determine if the time to handover is short. See block 87. If the time to handover is not short, the process ends. If the time to handover is short, at block 89, the information contained in the beacon of the acquired satellite is analyzed to determine the location of potential handover satellites. Then, at block 91, the antenna of the ground station is pointed toward the location of one of the potential handover satellites and the beacon of that satellite is acquired. Then a test is made to determine if it is the correct satellite. See block 93. If the potential handover satellite is not the correct satellite, the antenna is pointed toward the location of another potential handover satellite (block 91) and the test (block 93) is repeated. If the correct satellite has been acquired, a test is made (block 87) to determine if the time to handover is short. If the time to handover is not short, the sequence ends. If the time to handover is short, the sequence of steps is repeated.

Figure 18:
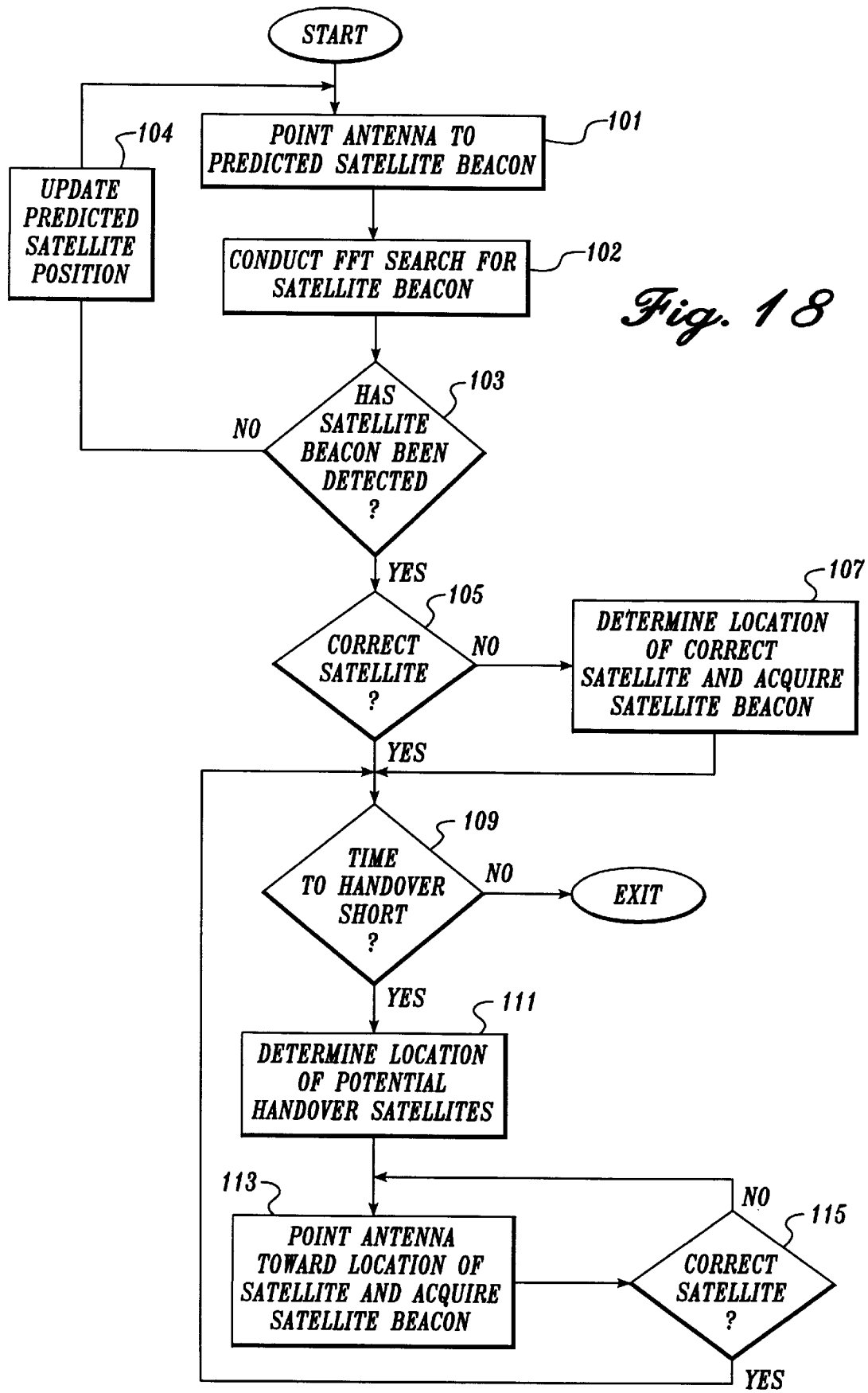
FIG. 18 is a flow diagram illustrating a third beacon constituent option.

FIG. 18 is a functional flow diagram illustrating the steps performed by a system implementing Option 3. As before, initially, the antenna of the ground terminal is pointed toward a predicted satellite position. See block 101. Then, at block 102, an FFT search is conducted for a satellite beacon. Then a test (block 103) is made to determine if a satellite beacon has been detected. If no satellite beacon is detected, the predicted satellite position is updated (block 104) and the sequence is repeated. When a satellite beacon is detected, at block 105, a test is made to determine if the satellite is the correct satellite, i.e., the satellites serving the cell within which the ground terminal is located. If the satellite is not the correct satellite, information contained in the beacon of the acquired satellite is analyzed to determine the location of the correct satellite, the antenna of the ground terminal is pointed toward the location of the correct satellite, and the beacon of that satellite is acquired. See block 107. Next, at block 109, a test is made to determine if the time to handover is short. If the time to handover is not short, the sequence ends. If the time to handover is short, at block 111, the location of potential handover satellites is determined based on the information contained in the beacon of the acquired satellite. Then, the antenna of the ground terminal is pointed toward the location of a potential handover satellite and the beacon of that satellite is acquired. See block 113. Then, at block 115, a test is made to determine if the newly acquired satellite is the correct satellite, i.e., the satellite serving the cell within which the terminal is located. If the satellite is not the correct satellite, the antenna is pointed toward the location of another potential handover satellite (block 113) and the test (block 115) is repeated. When the correct handover satellite is acquired, a test (block 109) is made to determine if the time to handover is short and, then, the sequence ends.

As will be readily appreciated from the foregoing description and reviewing FIGS. 16, 17, and 18, all options have various advantages and disadvantages. Clearly, Option 1 (FIG. 15) has the advantage of lower cost and faster beacon repeatability because the beacon contains the smallest amount of information. The disadvantage of Option 1 is that a terminal performing satellite acquisition without any prior knowledge about satellite positions can acquire three incorrect satellites (worst case) before acquiring the satellite serving its cell. Thus, acquisition time is likely slow in most instances Another disadvantage is that a traffic channel has to be used to convey information about the position and velocity of potential handover satellites, if this information is to be conveyed to ground terminals, since the beacon does not contain this information.

Option 2 has the same initial satellite acquisition problem as Option 1. However, Option 2 has the advantage of not having to rely on a traffic channel for information about the position and velocity of potential handover candidates. In the case of Option 3, a terminal with no prior knowledge can acquire at most one wrong satellite before acquiring the one serving its geographic area. This is because when the ground terminal acquires one satellite it knows the position of eight adjacent satellites, one of which is guaranteed to be serving the cell within which the ground terminal lies. Hence, the ground terminal can immediately repoint its antenna toward the correct satellite. Also with this option, the position of all potential handover candidates is known.

Returning to FIG. 7, assuming a five-second update period, a ground terminal has to wait a maximum of just under ten seconds after detecting a satellite beacon and synchronizing the ground terminal to the satellite before receiving a complete set of satellite position and velocity data. A test is then made to determine if the correct satellite is acquired as determined by the satellite coverage area 59, and the search continued toward another predicted satellite position 61 if the correct satellite is not acquired. Once the correct satellite is acquired, the ground terminal estimates the time to handover 63, which can be easily calculated because the acquired satellite's position and velocity are known to the ground terminal. If it is a "long" time to handover, the ground terminal synchronizes to the satellite frame clock and begins transmitting on the contention channel. Otherwise, the ground terminal waits to point to a rising satellite before completing network acquisition. Obviously the length of the "short" and "long" times are relative system parameters that may be adjusted depending on a variety of factors, including the amount of data to be transmitted or received by the ground terminal.

As illustrated in FIG. 15 and described above, satellite position and velocity at a given time are related to the corresponding satellite by a satellite identifier. The exemplary baseline illustrated in FIG. 15 allocates 64 databits to denote time, 10 databits to identify a satellite, and 5 databits to identify the contention channel. The number of databits used to represent each component of the three-dimensional position and velocity vector is 32. Given that the maximum radio distance between the center of the earth and the highest orbital plane satellite is less than 10,000 km for the exemplary satellite network described above, it can be shown that a 32 databit representation of position results in a quantization error of about 4.65 E-6 km. If this level of quantization is not necessary, the 32 databits can be reduced.

Figure 19:
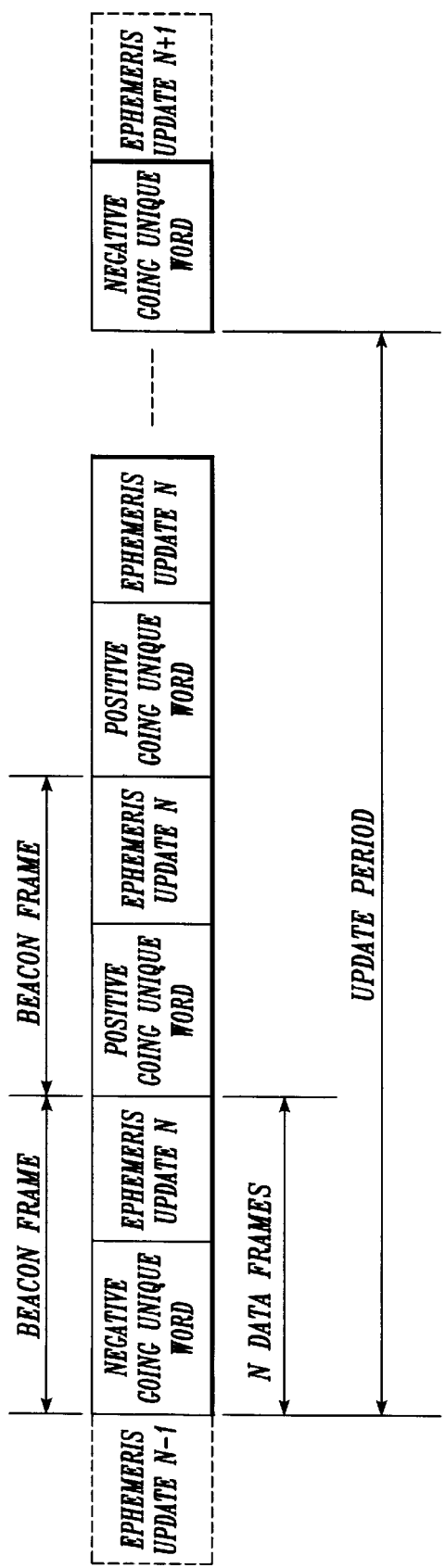
FIG. 19 is a data diagram illustrating the preferred beacon frame structure and its relationship to terminal-to-satellite link (TSL) data frames.

In addition to the foregoing, the satellite beacon includes a 21 databit unique word. The unique word serves two purposes: to denote a new set of ephemeris data and to establish frame timing. Preferably, the unique word is inserted once every predetermined interval, such as 115.06 $\mu$sec, and detected by correlating the unique word against a locally (terminal) generated unique word. The correlation of the two unique words produces a beacon frame clock that is related to the rate of the data frame clock by some factor, such as ⅑. As depicted in FIG. 19, the unique word is preferably used to denote the start of ephemeris updates, by reversing its polarity at predetermined intervals, such as once very five seconds, and correlating it with the same terminal generated unique word, i.e., the terminal generated unique word used to detect beacon frame boundaries. The result is a negative correlation peak once every reversal period, e.g., once every five seconds, and a positive peak every period, e.g., every 115.06 ms. It should be noted that increasing the time between unique words increases link frame synchronization error because errors in beacon frame synchronization are scaled by the ratio of beam frame duration to data frame duration. Decreasing the time between unique words decreases the error, but increases the information rate because unique words have to be inserted more often. The unique word is also used to establish frame timing, as described more fully below.

Figure 20:
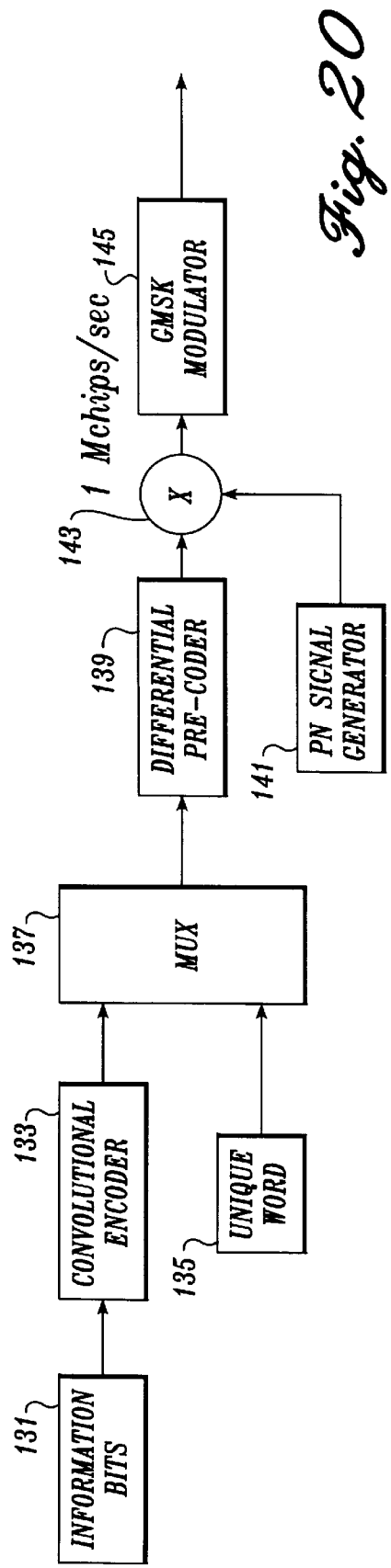
FIG. 20 is a block diagram illustrating a beacon modulator for creating the beacon frame structure illustrated in FIG. 19.

FIG. 20 illustrates the presently preferred baseline beacon modulation system. Information databits 131, i.e., databits identifying the satellite, the satellite's position and velocity, the satellite's time, and the contention channel, are forward error correction (FEC) encoded by a convolutional encoder 133. The FEC coded data is multiplexed with the unique word 135 by a multiplexer 137. The output of the multiplexer is precoded by a differential precoder 139. The output of the differential precoder is mixed with a signal produced by a pseudonoise (PN) signal generator 141 in a mixer 143. The output is modulated by a suitable modulator 145, such as a gaussian minimum shift keying (GMSK) modulator. As a result, the beacon is, in effect, a direct sequence spread spectrum GMSK signal.

Figure 21:
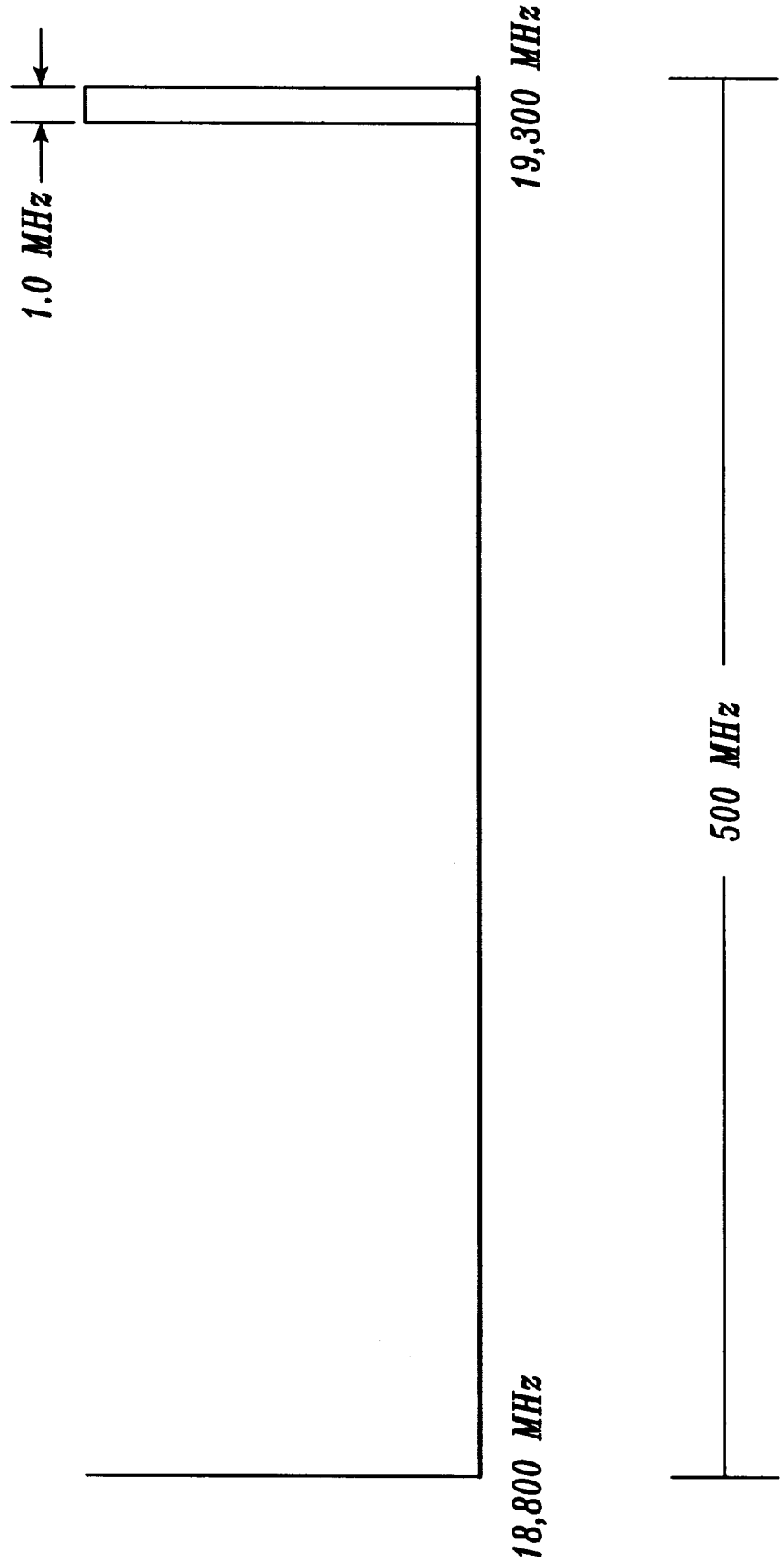
FIG. 21 illustrates the preferred location of the beacon frequency with respect to the data spectrum.

While the beacon spectrum can be located in any portion of the bandwidth of the downlink communication spectrum, preferably, it is positioned at the top edge of the downlink spectrum. Positioning the beacon at the upper edge of the downlink spectrum minimizes the interference with the downlink data signals. In this regard, attention is directed to FIG. 21, which illustrates an exemplary downlink spectrum of 500 MHz lying between 18,800 MHz (18.8 GHz) and 19,300 MHz (19.3 GHz). The beacon has a bandwidth of 1 MHz located at the upper end of the band, i.e., between 19,299 and 19,300 MHz.

Since the beacon demodulator is coherent, the beacon carrier frequency acquisition and tracking can be accomplished using closed loop techniques. Preferably, the beacon frequency is estimated from the FFT information developed in the manner previously described. The estimate is used to set the carrier frequency of a numerically controlled oscillator (NCO). The frequency estimation error is equal to 1/FFT bin, which is equal to 1/FFT observation time, which, in turn, is equal to 1/FFT dwell time. Preferably, the bandwidth of the NCO loop is set to be about 2–4 times greater than the maximum estimation error to ensure a high probability of pull in. After beacon demodulation, the start of beacon updates are identified by detecting the negative going unique word, which is inserted periodically at the start of each ephemeris update, as illustrated in FIG. 19 and previously described.

While beacon detection can occur in the presence of a substantial, e.g., 3 dB, antenna pointing loss, it is not desirable to communicate on the contention channel with such a large pointing loss. Antenna pointing losses can be reduced by using the most recent satellite coordinates to update the antenna pointing coordinates. The use of the global positioning system satellites allows the LEO satellite position to be known to a spherical accuracy of 0.1 km or better, allowing a pointing accuracy of 0.1 km or better.

2. Uplink Data Frame Synchronization

The use of a TDMA air interface to coordinate spectrum sharing between terminals requires that the terminals time their uplink data transmissions so that the transmissions arrive at the serving satellite within predetermined timeslot boundaries. Once a satellite is acquired it is therefore necessary to synchronize the uplink data framing, that is, synchronize the frames at the satellite and the ground terminal to a common clock. In a preferred embodiment of the system, the ground terminal must know the satellite's frame timing to within a predetermined amount, e.g., ±3.67 μsec, in order to insure that the uplink data transmissions are accurately timed.

Figure 22:
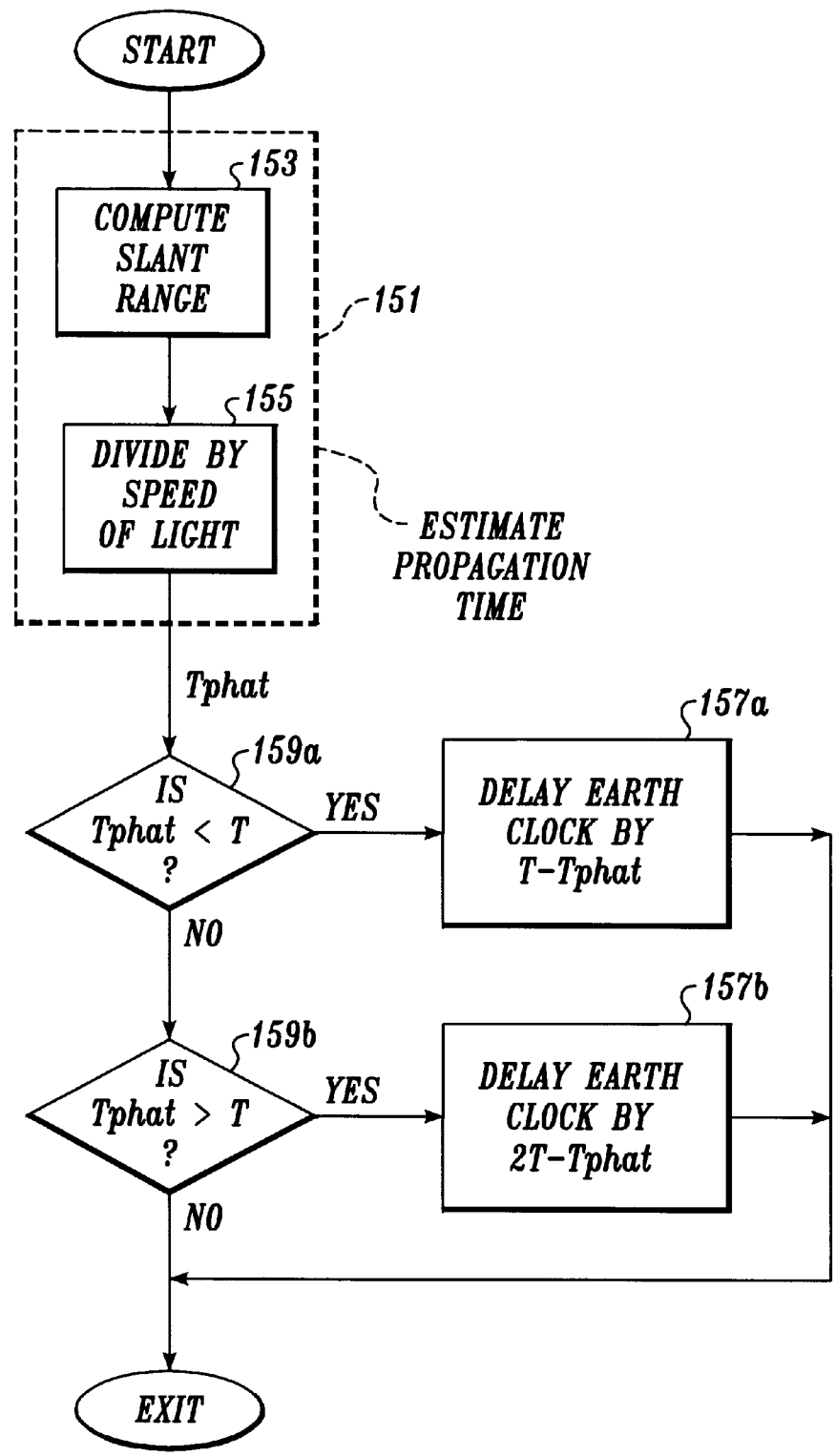
FIG. 22 is a flow diagram illustrating data frame synchronization.
Figure 23:
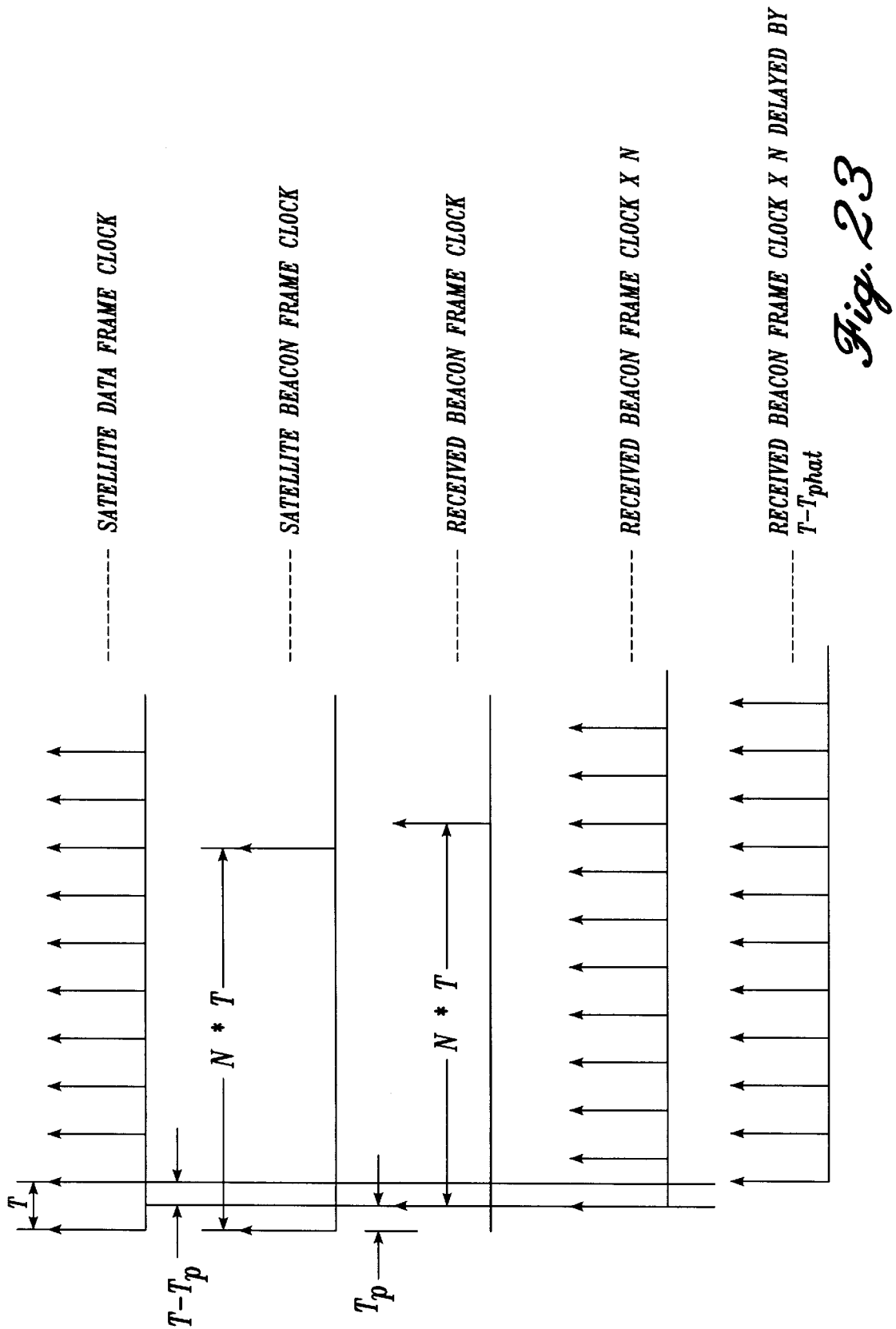
FIG. 23 is a timing diagram illustrating data frame synchronization.

FIGS. 22 and 23 depict how to synchronize the uplink data frame based on the received beacon. As noted above, the beacon includes a unique word that is inserted once every predetermined number (e.g., 9) of uplink data frames. The uplink data frame rate is therefore obtained by multiplying the received beacon frame by the predetermined number, e.g., 9. At this point, the Earth-based data frame clock and the satellite-based data frame clock have the same rate, but are not phase synchronous. Aligning the phases requires delaying the Earth-based clock by $T-T_{phat}$, where T is the data frame duration and $T_{phat}$ is an estimate of the downlink propagation time, $T_p$, i.e., the time it takes for the beacon to propagate from the satellite to the ground station.

As shown in FIG. 22, an estimate of the downlink propagation time 151 is determined by computing the slant range 153 between the satellite and the ground terminal and dividing the slant range by the speed of light 155. As noted above, the GPS signals allow the satellite to determine its position to an accuracy of 0.1 km. The satellite position information is included in the position and velocity information contained in the beacon. Those skilled in the art will recognize that the slant range may therefore be easily computed by the ground terminal using the received satellite position information and the known position of the ground terminal. In the preferred embodiment of the system, the slant range may be computed to within a maximum error of ±1.1 km.

After computing an estimated propagation time $T_{phat}$, a test is made at decision block 159b to determine whether the propagation time is less than the data frame duration T. FIG. 23 shows the case when $T_{phat}=T_p<$ and $T_p<T$. The first line of FIG. 23 shows the satellite data frame clock. The second line shows the satellite beacon frame clock, which is synchronized to the satellite data frame clock, but at a lower frequency—⅑ in the example shown in FIG. 23 (frame factor of N=9). The third line shows the timing of the beacon frame clock received at the ground terminal. As shown, the latter clock is delayed by the propagation time $T_p$. The fourth line shows the received beacon frame clock multiplied by the frame factor, 9. This clock frequency is the same as the frequency of the satellite data frame clock, but is out of phase with the satellite data frame clock. As shown in the fifth line, the clocks are synchronized by delaying the ground terminal clock by a time $T-T_{phat}$. The delay step is indicated at a block 157b in FIG. 22.

Delaying the ground terminal clock by $T-T_{phat}$ is only effective if the estimated delay time $T_{phat}$ is less than the data frame duration T. Depending on the relative locations of the ground terminal and the transmitting satellite, the transmission delay time may exceed the data frame duration T. At a decision block 159a, a test is therefore made to determine if the estimated delay time is greater than the data frame duration, i.e., if $T_{phat}>T$. If $T_{phat}$ is greater than T, at a block 157a the ground terminal clock is delayed by a time $2T-T_{phat}$. Delaying the ground terminal clock in this amount ensures that the ground terminal and transmitting satellite clocks are phase synchronous to within an estimated propagation time error.

The error in estimating the propagation time is determined by the accuracy in measuring the slant range between the satellite and the ground terminal. In the preferred embodiment of the system, the maximum error in estimating the propagation time is ±3.67 usec based on a satellite positional error of ±1.1 km.

Figure 24:
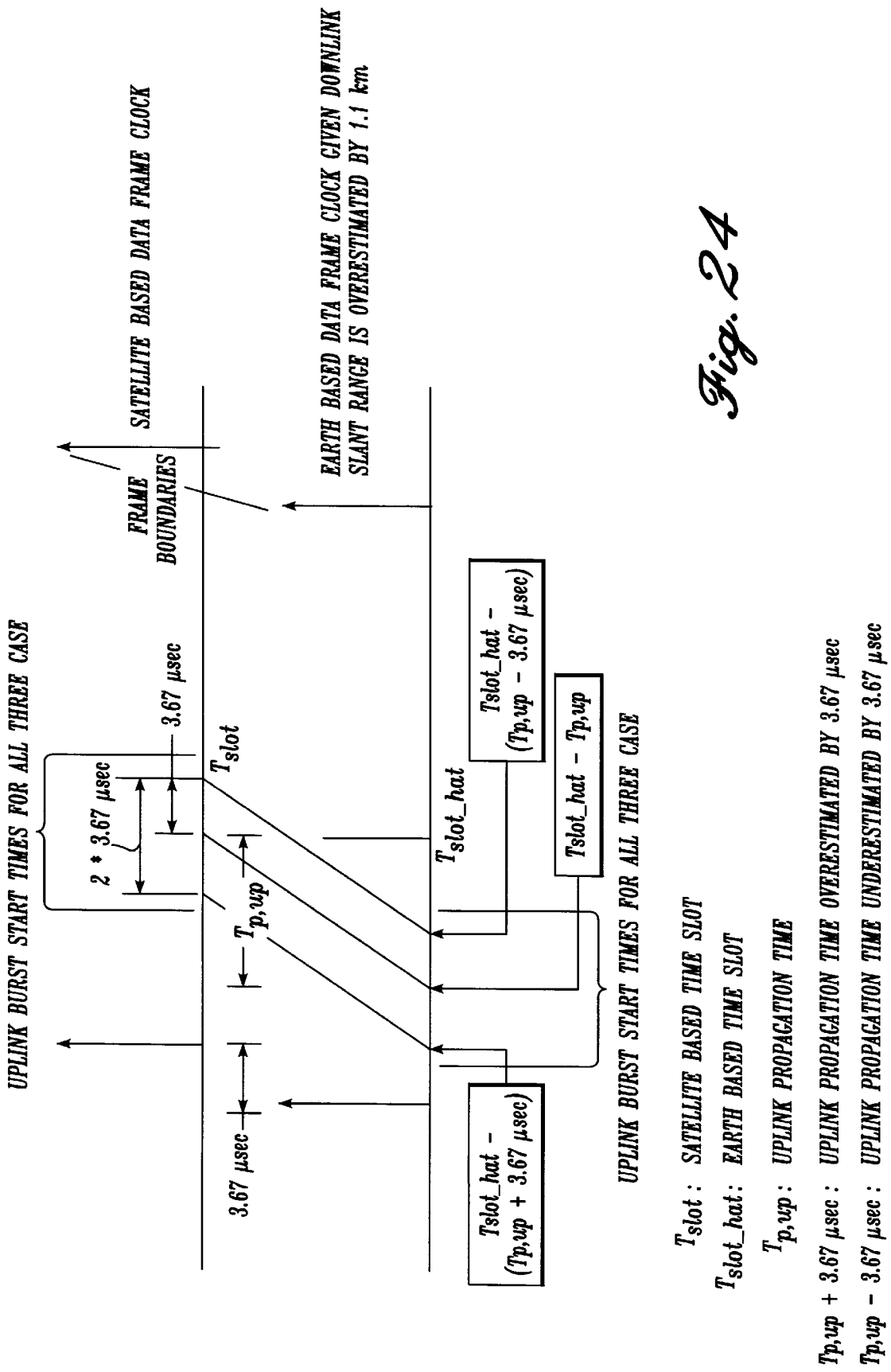
FIG. 24 is an example of the error in uplink burst arrival time given a downlink slant range error.

In order to ensure that uplink bursts arrive at the satellite at TDMA slot boundaries, the terminal needs to estimate the uplink propagation time and, then, begin transmitting its uplink bursts that much earlier. As discussed above, the ground terminal is synchronized to the data frame boundaries to within a predetermined amount (±3.67 μsec). Since the TDMA slots are fixed relative to the frame boundary, the ground terminal knows the TDMA slot positions to within this amount, i.e., ±3.67 μsec. FIG. 24 shows the error and uplink arrival time for three different cases when the downlink propagation time has been overestimated by 3.67 μsec and (1) the uplink has no error; (2) the uplink propagation time is underestimated by 3.67 μsec; and (3) the uplink propagation time is overestimated by 3.67 μsec. When the uplink propagation time is predicted correctly, the uplink burst arrives 3.67 μsec early due to the error in estimating the downlink time. When the uplink time is underestimated, the uplink burst starts 3.67 μsec later than it should and arrives at a time slot on time due to the cancellation of downlink and uplink errors. When the uplink and downlink are both overestimated, the error is doubled and the uplink burst arrives up to 2*(3.67) μsec early. Similarly, underestimating the downlink propagation time by 3.67 μsec can lead to an uplink arrival time that is up to 2*(3.67) μsec late relative to the satellite-based time slot. Appropriate guard times are therefore incorporated at the satellite to allow such timing errors without causing interference between signals transmitted from ground terminals assigned to adjacent TDMA timeslots.

3. Uplink Carrier Frequency Compensation

The relative motion between the satellite and the ground terminal will cause a Doppler shift in the frequency of the signal transmitted from the terminal to the satellite. It is advantageous to compensate for this Doppler shift prior to transmission because pre-compensation reduces the complexity of the satellite-based demodulators and minimizes the guard bands between uplink TDMA channels operating at different frequencies. Without uplink Doppler compensation, data transmissions received at a satellite can have a relatively large Doppler shift—±250 kHz—when operating in the exemplary Ka frequency band at the satellite altitude described above.

Figure 25:
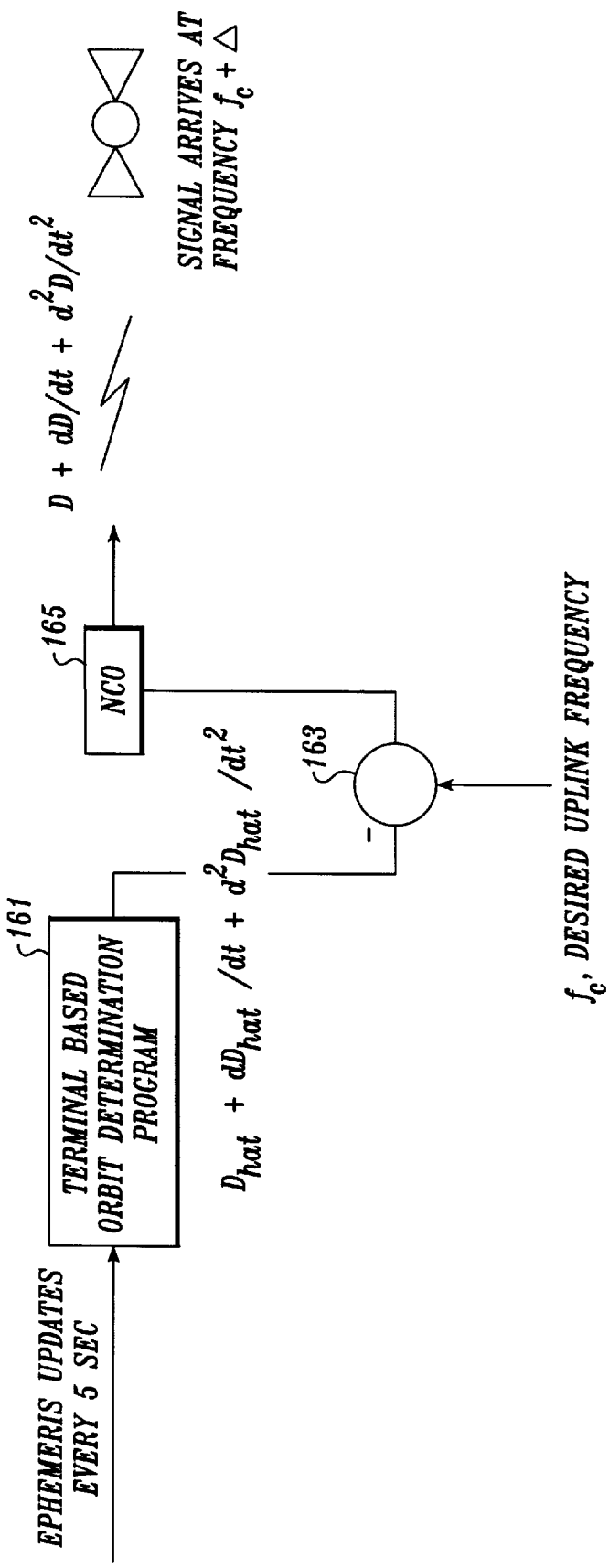
FIG. 25 is a block diagram of an uplink Doppler compensation system.

FIG. 25 is a block diagram illustrating a system for pre-compensating the frequency of the signal transmitted from the ground terminal to account for the expected Doppler shift. As shown in FIG. 25, a terminal-based orbit determination program 161 is updated by ephemeris updates received from the satellite every predetermined period, e.g., every five seconds. The ground terminal uses this information to compute the satellite slant range and its first, second, and third derivatives. Dividing the slant range derivatives by the speed of light and scaling them to the desired frequency, $f_c$, yields the appropriate estimates for the Doppler, Doppler rate, and change in Doppler rate.

The signal transmitted from the ground terminal will arrive at the satellite at the desired frequency, $f_c$, if the signal is transmitted at a frequency $f_c-(D_{hat}+dD_{hat}/dt+d^2D_{hat}/dt^2)$ where $D_{hat}$ is the estimated Doppler shift, $dD_{hat}/dt$ is the estimated Doppler rate, and $d^2D_{hat}/dt^2$ is the estimated change in Doppler rate. The estimated uplink Doppler, Doppler rate, and Doppler rate derivative are therefore subtracted 163 from the desired uplink transmit frequency, $f_c$, to remove the Doppler effect. The results of the subtraction controls a numerically controlled oscillator 165, which pre-adjusts the frequency of the signal transmitted to the satellite. The end result is that the transmitted signal arrives at the satellite at the desired frequency, $f_c$, plus any errors, Δ, that are introduced by the estimation process.

4. Downlink Carrier Frequency Acquisition and Tracking

Preferably downlink data transmissions to ground terminals involve hopping (switching) antenna beams that periodically illuminate each Earth-fixed cell. Consequently, downlink data transmissions are received by the ground terminal in bursts and at irregular intervals. As on the uplink, the Doppler shift of the downlink carrier can be very high. The Doppler shift and the fact that downlink data transmission bursts can be relatively short (e.g., four packets) present a challenging frequency acquisition problem for the ground terminal.

Figure 26:
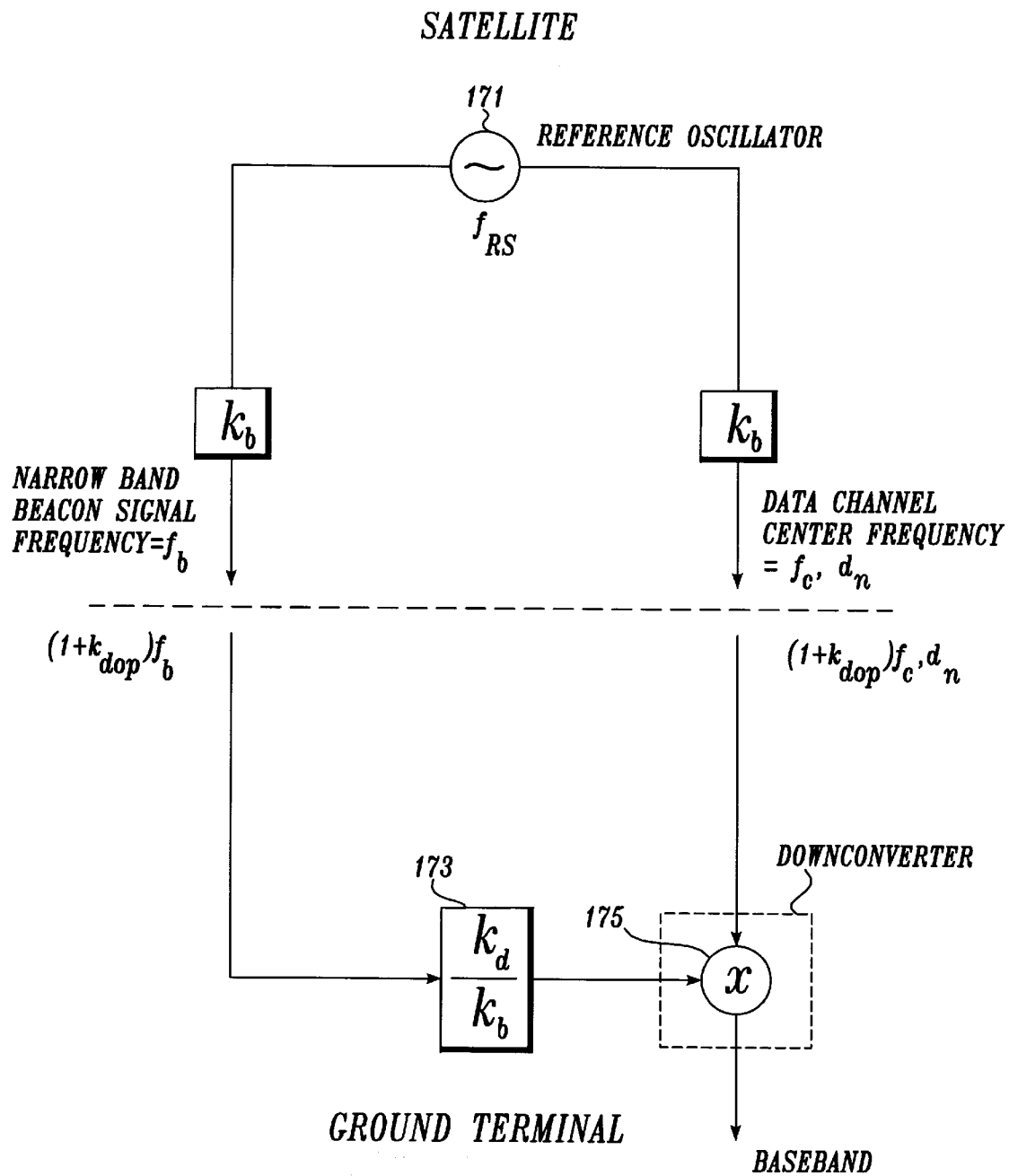
FIG. 26 is a block diagram of a downlink Doppler compensation system.

FIG. 26 is a block diagram of a preferred system used to estimate, acquire, and track the downlink carrier frequency f, using the beacon signal. At the satellite level, a reference oscillator 171 is used to generate a narrowband beacon signal having a frequency $f_b$ by scaling the reference oscillator signal by a constant $k_b$. The reference oscillator 171 is also used to generate a downlink carrier signal having a frequency $f_b$ by scaling the reference oscillator signal by a constant $k_d$. Both signals are transmitted from the satellite to the ground terminal, the beacon signal continuously and the downlink carrier signal in bursts, as noted above. During transmission, each signal is Doppler shifted in accordance with the relative motion of the satellite with respect to the ground terminal.

Figure 27A:
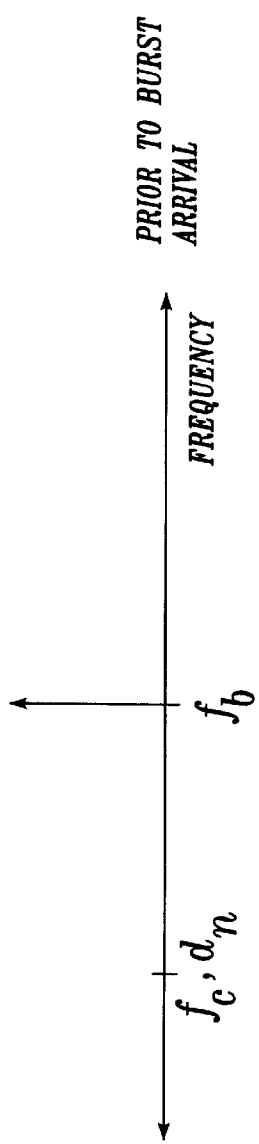
FIGS. 27A–27C are graphs depicting a frequency spectrum of signals received by the downlink Doppler compensation system of FIG. 26.
Figure 27B:
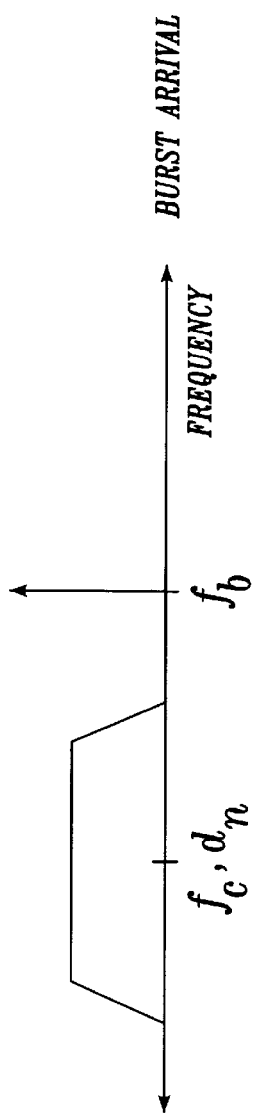
Figure 27C:
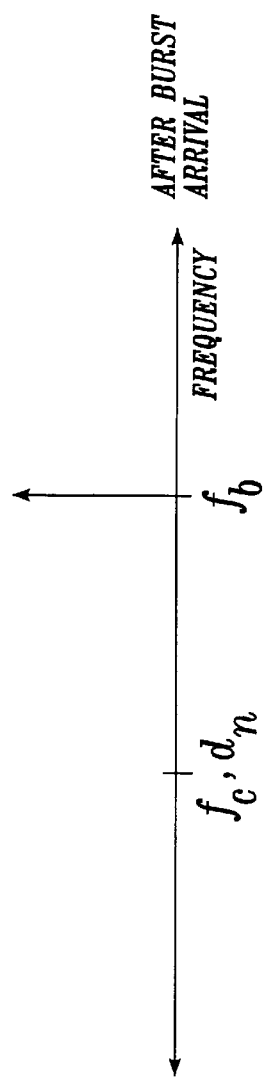

At the ground terminal, the beacon signal having a carrier frequency $f_b$ is continuously tracked as the Doppler shift varies using techniques known to those skilled in the art. FIG. 27A–27C graphically depict the frequency spectrum of the signals received at the ground terminal. As shown in FIG. 27A, prior to a burst of data arriving at the ground terminal, only the beacon signal is detected at a frequency $f_b$. As shown in FIG. 26, the beacon carrier frequency is scaled by the known constant $k_d/k_b$ (see block 173) and the result used to determine the downlink carrier frequency, which is used to control a downconverter 175. Since the beacon signal and the downlink carrier signal are approximately equally affected by the satellite-motion induced Doppler shift, the Doppler shift is removed and the downlink carrier frequency $f_c, d_n$ is easily estimated. As shown in FIG. 27B, when a data burst from the satellite arrives at the ground terminal, the pre-estimated downlink carrier frequency $f_c, d_n$ allows the data burst to be quickly acquired, even though both the downlink carrier frequency and the beacon carrier frequency have been Doppler shifted upward in frequency. Following receipt of the bursted data, the ground terminal continues to monitor the beacon signal, as depicted in FIG. 27C. Continuously tracking the beacon signal allows the downlink carrier frequency $f_c, d_n$, to be quickly and easily acquired and tracked.

In accordance with this invention, the foregoing and other challenges associated with a LEO satellite communication network of the type illustrated in FIG. 1 are overcome by each satellite producing a beacon signal that, preferably, falls within the communication spectrum. The beacon is utilized by the ground terminals to establish and maintain a communications link. More specifically, the beacon is used by the ground stations to accomplish: accurate antenna pointing; downlink carrier frequency synchronization; data frame synchronization; and uplink carrier frequency synchronization.

While the preferred embodiment of the invention has been illustrated and described, it will be appreciated that various changes can be made therein without departing from the spirit and scope of the invention. For example, while the invention has been described in connection with a LEO Earth-fixed cell satellite communication network, the invention can be used with other types of satellite networks including LEO satellite communication networks using satellite-fixed beams and geosynchronous satellite communication networks. Hence, within the scope of the appended claims it is to be understood that the invention can be practiced otherwise than as specifically described herein.

The embodiments of the invention in which an exclusive property or privilege is claimed are defined as follows:

1. A ground terminal beacon acquisition and synchronization system for a satellite communication network comprising a plurality of orbiting satellites and a plurality of ground terminals that communicate with one another via uplink and downlink data channels to and from the orbiting satellites, each of said orbiting satellites producing a beacon, said ground terminal beacon acquisition and synchronization system comprising:
   (a) an antenna;
   (b) a satellite acquisition system for:
      (i) pointing said antenna toward a predicted satellite position and determining if a satellite is located at a predicted satellite position based on whether a beacon is emanating from said predicted satellite position;
      (ii) if no satellite is located at the predicted satellite position, causing the antenna to point toward another predicted satellite position and determining if a satellite is located at said another predicted satellite position based on whether a beacon is emanating from said another predicted satellite position;
      (iii) if a satellite is located at the predicted satellite position, determining if the satellite is serving the geographic area in which the ground terminal lies based on information contained in the beacon; and
      (iv) if the satellite is not serving the geographic area in which the ground terminal lies, causing the antenna to point toward still another predicted satellite position and determining if a satellite is located at said still another predicted satellite position based on whether a beacon is emanating from said still another satellite position; and
      (v) repeating (ii) through (iv) until the satellite serving the geographic area in which the ground terminal lies is located; and
   (c) a synchronization system for synchronizing the ground terminal to the satellite serving the geographic area in which the ground terminal lies based on information contained in the beacon.

2. A ground terminal beacon acquisition and synchronization system as claimed in claim 1 wherein the satellite acquisition system also determines how long the satellite will continue to serve the geographic area in which the ground terminal lies prior to the synchronizing system synchronizing the ground terminal to the satellite.

3. A ground terminal beacon acquisition and synchronization system as claimed in claim 2 wherein the synchronizing system does not synchronize the ground terminal to the satellite serving the geographic area in which the ground terminal lies if the period of time is short and, instead, the satellite acquisition system points the antenna toward yet still another predicted satellite position and determines if a satellite is located at said yet still another predicted satellite position based on whether a beacon is emanating from said yet still another satellite position.

4. A ground terminal beacon acquisition and synchronization system as claimed in claim 3 wherein said synchronizing system synchronizes said ground terminal to the satellite serving the geographic area in which the around terminal lies if the period of time is long.

5. A ground terminal beacon acquisition and synchronization system as claimed in claim 4 wherein the satellite acquisition system uses the beacon to accurately point the antenna of the ground terminal toward the satellite serving the geographic area in which the ground terminal lies.

6. A ground terminal beacon acquisition and synchronization system as claimed in claim 5 wherein the synchronization system uses information contained in the beacon to accurately time uplink data transmissions.

7. A ground terminal beacon acquisition and synchronization system as claimed in claim 6 wherein the synchronization system uses information contained in the beacon to estimate uplink Doppler, Doppler rate, Doppler rate derivative, and uses the estimate to pre-compensate the carrier frequency of the uplink data channel for Doppler and Doppler rate.

8. A ground terminal beacon acquisition and synchronization system as claimed in claim 7 wherein the synchronization system uses information contained in the beacon to continuously track downlink carrier frequency by continuously tracking beacon carrier frequency, scaling the result by a suitable scaling factor, and using the scaled result to locate the downlink carrier frequency.

9. A ground terminal beacon acquisition and synchronization system as claimed in claim 8 wherein the scaling factor is equal to a scaling factor applied to the beacon by the satellite serving the geographic area in which the ground terminal lies divided by a sealing scale factor applied to the downlink carrier frequency by the satellite serving the geographic area in which the ground terminal lies.

10. A ground terminal beacon acquisition and synchronization system as claimed in claim 8 wherein the beacon includes information regarding the identity of the satellite with which the beacon is associated and wherein the satellite acquisition system uses the identity information to assist in determining if a satellite is serving the geographic area in which the ground terminal lies.

11. A ground terminal beacon acquisition and synchronization system as claimed in claim 10 wherein said beacon also includes information about the satellite position and velocity and wherein the satellite synchronization system uses the position and velocity information to determine the slant range between the ground terminal and the satellite serving the geographic area in which the ground terminal lies.

12. A ground terminal beacon acquisition and synchronization system as claimed in claim 11 wherein the satellite synchronization system uses said satellite position and velocity information to estimate uplink Doppler, Doppler rate, and Doppler rate derivative.

13. A ground terminal beacon acquisition and synchronization system as claimed in claim 12 wherein the beacon includes an identifier for identifying the contention channel to be used by a ground station.

14. A ground terminal beacon acquisition and synchronization system as claimed in claim 13 wherein the beacon includes information about the identity of satellites other than the satellite associated with the beacon.

15. A ground terminal beacon acquisition and synchronization system as claimed in claim 14 wherein said satellite identity information includes information about the identity of handover satellites.

16. A ground terminal beacon acquisition and synchronization system as claimed in claim 15 wherein in addition to the identity of handover satellites, the beacon also includes information about the position and velocity of the handover satellites and wherein the satellite acquisition system utilizes the position and velocity information to point the antenna toward said still another predicted satellite position.

17. A ground terminal beacon acquisition and synchronization system as claimed in claim 16 wherein said beacon includes a unique word and wherein said unique word is used by said satellite synchronization system to identify a beacon frame.

18. A ground terminal beacon acquisition and synchronization system as claimed in claim 17 wherein said synchronization system also utilizes said unique word to determine when satellite position and velocity is updated.

19. A ground terminal beacon acquisition and synchronization system as claimed in claim 1 wherein the satellite acquisition system uses the beacon to accurately point the antenna of the ground terminal toward the satellite serving the geographic area in which the ground terminal lies.

20. A ground terminal beacon acquisition and synchronization system as claimed in claim 1 wherein the synchronization system uses information contained in the beacon to accurately time uplink data transmissions.

21. A ground terminal beacon acquisition and synchronization system as claimed in claim 1 wherein the synchronization system uses information contained in the beacon to estimate uplink Doppler, Doppler rate, Doppler rate derivative, and uses the estimate to pre-compensate the carrier frequency of the uplink data channel for Doppler and Doppler rate.

22. A ground terminal beacon acquisition and synchronization system as claimed in claim 1 wherein the synchronization system uses information contained in the beacon to continuously track downlink carrier frequency by continuously tracking beacon carrier frequency, scaling the result by a suitable scaling factor, and using the scaled result to locate the downlink carrier frequency.

23. A ground terminal beacon acquisition and synchronization system as claimed in claim 22 wherein the scaling factor is equal to a scaling factor applied to the beacon by the satellite serving the geographic area in which the ground terminal lies divided by a sealing scale factor applied to the downlink carrier frequency by the satellite serving the geographic area in which the ground terminal lies.

24. A ground terminal beacon acquisition and synchronization system as claimed in claim 1 wherein said beacon includes information regarding the identity of the satellite with which the beacon is associated and wherein the satellite acquisition system uses the identity information to assist in determining if a satellite is serving the geographic area in which the ground terminal lies.

25. A ground terminal beacon acquisition and synchronization system as claimed in claim 24 wherein said beacon also includes information about the satellite position and velocity and wherein the satellite synchronization system uses the position and velocity information to determine the slant range between the ground terminal and the satellite serving the geographic area in which the ground terminal lies.

26. A ground terminal beacon acquisition and synchronization system as claimed in claim 1 wherein the beacon includes an identifier for identifying the contention channel to be used by a ground station.

27. A ground terminal beacon acquisition and synchronization system as claimed in claim 1 wherein the beacon includes information about the identity of satellites other than the satellite from which a beacon emanates.

28. A ground terminal beacon acquisition and synchronization system as claimed in claim 27 wherein said satellite identity information includes information about the identity of handover satellites.

29. A ground terminal beacon acquisition and synchronization system as claimed in claim 28 wherein in addition to the identity of handover satellites, the beacon also includes information about the position and velocity of the handover satellites and wherein the satellite acquisition system utilizes the position and velocity information to point the antenna toward said still another predicted satellite position.

30. A ground terminal beacon acquisition and synchronization system as claimed in claim 1 wherein said beacon includes a unique word and wherein said unique word is used by said satellite synchronization system to identify a beacon frame.

31. A ground terminal beacon acquisition and synchronization system as claimed in claim 30 wherein said synchronization system also utilizes said unique word to determine when satellite position and velocity is updated.

* * * * *

UNITED STATES PATENT AND TRADEMARK OFFICE
CERTIFICATE OF CORRECTION

PATENT NO. : 5,936,570
DATED : August 10, 1999
INVENTOR(S) : F. Ghazvinian et al.

It is certified that error appears in the above-identified patent and that said Letters Patent is hereby corrected as shown below:

| COLUMN | LINE | | |
|---|---|---|---|
| 20 (Claim 4, | line 4) | 11 | "around" should read --ground-- |
| 20 (Claim 9, | line 5) | 39 | "a sealing scale factor" should read --a scaling factor-- |
| 22 (Claim 23, | line 5) | 1 | "a sealing scale factor" should read --a scaling factor-- |

Signed and Sealed this

Thirteenth Day of June, 2000

Attest:

Q. TODD DICKINSON

*Attesting Officer*     *Director of Patents and Trademarks*